US012802381B2

(12) United States Patent
Xu

(10) Patent No.: US 12,802,381 B2
(45) Date of Patent: Nov. 17, 2026

(54) VISIBLE VIRTUAL OBJECT DETECTION

(71) Applicant: Tencent Technology (Shenzhen) Company Limited, Shenzhen (CN)

(72) Inventor: Minjie Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 73 days.

(21) Appl. No.: 19/097,176

(22) Filed: Apr. 1, 2025

(65) Prior Publication Data

US 2025/0232547 A1 Jul. 17, 2025

Related U.S. Application Data

(63) Continuation of application No. PCT/CN2024/082405, filed on Mar. 19, 2024.

(30) Foreign Application Priority Data

Mar. 21, 2023 (CN) ......................... 202310310188.9

(51) Int. Cl.

*G06T 19/20* (2011.01)
*G06F 3/01* (2006.01)
*G06T 13/40* (2011.01)
*G06T 13/60* (2011.01)

(52) U.S. Cl.

CPC .............. *G06T 19/20* (2013.01); *G06F 3/013* (2013.01); *G06T 13/40* (2013.01); *G06T 13/60* (2013.01); *G06T 2219/2016* (2013.01)

(58) Field of Classification Search

CPC ......... G06T 19/20; G06T 13/40; G06T 13/60; G06T 2219/2016; G06F 3/013
See application file for complete search history.

(56) References Cited

U.S. PATENT DOCUMENTS

| | | | | |
|---|---|---|---|---|
| 8,641,526 | B1 * | 2/2014 | Sitnikov | A63F 13/67 463/37 |
| 2012/0013613 | A1 * | 1/2012 | Vesely | H04N 13/30 345/419 |
| 2019/0018479 | A1 * | 1/2019 | Minami | G06F 3/013 |

(Continued)

FOREIGN PATENT DOCUMENTS

| | | | |
|---|---|---|---|
| CN | 111589115 | A | 8/2020 |
| CN | 111921200 | A | 11/2020 |

(Continued)

*Primary Examiner* — Terrell M Robinson

(74) *Attorney, Agent, or Firm* — Banner & Witcoff, Ltd.

(57) ABSTRACT

A data processing apparatus may perform the following operations: acquiring first field of view information and a first line-of-sight point of a first virtual object; acquiring a plurality of second line-of-sight points of a second virtual object; detecting at least one second line-of-sight point based on the first line-of-sight point and the first field of view information to obtain a detection result of the at least one second line-of-sight point, a detection result of each second line-of-sight point characterizing whether each second line-of-sight point is visible from the first line-of-sight point; and determining the second virtual object as a visible virtual object of the first virtual object if the detection result of the at least one second line-of-sight point characterizes that the at least one second line-of-sight point is visible from the first line-of-sight point.

20 Claims, 7 Drawing Sheets

(56) References Cited

U.S. PATENT DOCUMENTS

| | | | | |
|---|---|---|---|---|
| 2019/0076739 | A1* | 3/2019 | Ge | A63F 13/537 |
| 2019/0114835 | A1 | 4/2019 | Costa et al. | |
| 2020/0316470 | A1* | 10/2020 | Yang | A63F 13/5372 |
| 2021/0220738 | A1* | 7/2021 | Yang | A63F 13/211 |
| 2022/0091725 | A1* | 3/2022 | Qiu | A63F 13/525 |

FOREIGN PATENT DOCUMENTS

| | | | |
|---|---|---|---|
| CN | 114642881 | A | 6/2022 |
| CN | 116943215 | A | 10/2023 |

* cited by examiner

VISIBLE VIRTUAL OBJECT DETECTION

CROSS REFERENCE TO RELATED APPLICATIONS

This application is a continuation application of PCT Application PCT/CN2024/082405, filed Mar. 19, 2024, which claims priority to Chinese Patent Application No. 202310310188.9, filed on Mar. 21, 2023, each entitled "DATA PROCESSING METHOD AND APPARATUS, DEVICE, AND READABLE STORAGE MEDIUM", and each of which is incorporated herein by reference in its entirety.

FIELD

Aspects described herein relate to the technical field of computers, and in particular, to a data processing method and apparatus, a device, and a readable storage medium.

BACKGROUND

In the technical field of computers, a virtual object manipulated by a computer program is often referred to as a non-player character (Non-Player Character, NPC). Generally, whether a virtual object in a game battle is a visible virtual object of an NPC may be determined, and if the virtual object is the visible virtual object of the NPC, it is determined that the virtual object may interact with the NPC. Based on this, how to determine a visible virtual object becomes a key technology.

SUMMARY

Aspects described herein provides a data processing method and apparatus, a device, and a readable storage medium, which can determine whether a virtual object is a visible virtual object of another virtual object, improve the authenticity of field of view detection, and help to improve data processing efficiency related to associations among different objects in a virtual three-dimensional scene. The technical solution includes the following content.

According to an aspect, a data processing method is provided and performed in an electronic device, including the following operations:

- acquiring first field of view information and a first line-of-sight point of a first virtual object, the first line-of-sight point being a point located at a specified portion of the first virtual object;
- acquiring a plurality of second line-of-sight points of a second virtual object, the first virtual object and the second virtual object being located in the same 3D scene, and each second line-of-sight point being a point located at a corresponding portion of the second virtual object;
- detecting at least one second line-of-sight point based on the first line-of-sight point and the first field of view information to obtain a detection result of the at least one second line-of-sight point, a detection result of each second line-of-sight point characterizing whether each second line-of-sight point is visible from the first line-of-sight point; and
- determining the second virtual object as a visible virtual object of the first virtual object if the detection result of the at least one second line-of-sight point characterizes that the at least one second line-of-sight point is visible from the first line-of-sight point.

According to another aspect, a data processing method apparatus is provided, including:

- an acquisition module configured to acquire first field of view information and a first line-of-sight point of a first virtual object, the first line-of-sight point being a point located at a specified portion of the first virtual object; and acquire a plurality of second line-of-sight points of a second virtual object, the first virtual object and the second virtual object being located in the same 3D scene, and each second line-of-sight point being a point located at a corresponding portion of the second virtual object;
- a detection module configured to detect at least one second line-of-sight point based on the first line-of-sight point and the first field of view information to obtain a detection result of the at least one second line-of-sight point, a detection result of each second line-of-sight point characterizing whether each second line-of-sight point is visible from the first line-of-sight point; and
- a determining module configured to determine the second virtual object as a visible virtual object of the first virtual object if the detection result of the at least one second line-of-sight point characterizes that the at least one second line-of-sight point is visible from the first line-of-sight point.

According to another aspect, an electronic device is provided, including a processor and a memory, the memory having at least one computer program stored therein, and the at least one computer program being loaded and executed by the processor to cause the electronic device to implement the data processing method according to any one of the foregoing aspects.

According to another aspect, a non-transitory computer-readable storage medium is further provided, having at least one computer program stored therein, and the at least one computer program being loaded and executed by a processor to cause an electronic device to implement the data processing method according to any one of the foregoing aspects.

According to another aspect, a computer program or computer program product is further provided, having at least one computer program stored therein, and the at least one computer program being loaded and executed by a processor to cause an electronic device to implement the data processing method according to any one of the foregoing aspects.

BRIEF DESCRIPTION OF THE DRAWINGS

In order to more clearly illustrate the technical solutions in the aspects described herein, the drawings in the descriptions of the aspects described herein will be briefly introduced below. It is clear that the drawings described below are some aspects described herein, and a person skilled in the art may obtain other drawings according to these drawings without involving any inventive effort.

DETAILED DESCRIPTION

To make the objectives, technical solutions, and advantages of this application clearer, the following further describes implementations of this application in detail with reference to the accompanying drawings.

Figure 1:
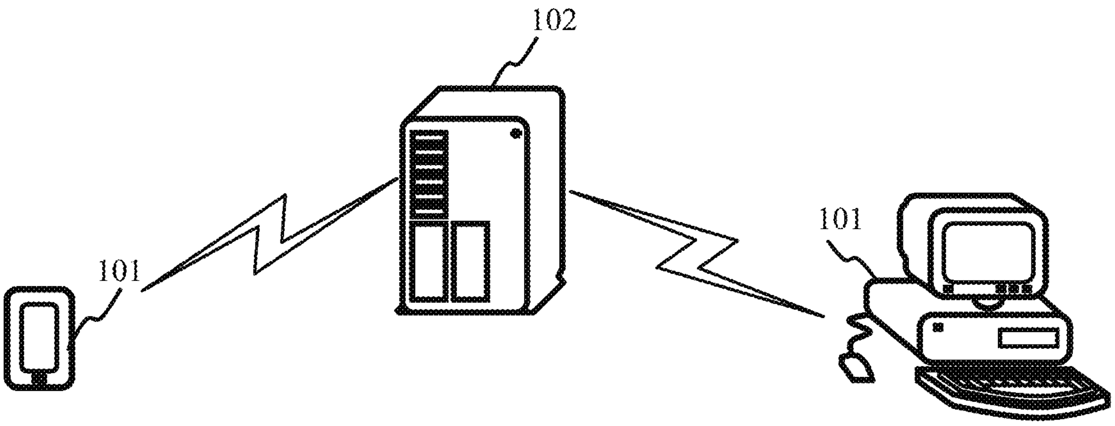
FIG. 1 is a schematic diagram of an implementation environment provided by one or more illustrative aspects described herein.

FIG. 1 is a schematic diagram of an implementation environment of a data processing method according to an aspect described herein. As shown in FIG. 1, the implementation environment includes a terminal device 101 and a server 102. The data processing method in the aspects described herein may be performed by the terminal device 101, or may be performed by the server 102, or may be performed jointly by the terminal device 101 and the server 102.

The terminal device 101 may be a smartphone, a game console, a desktop computer, a tablet computer, a laptop portable computer, a smart television, a smart in-vehicle device, a smart voice interaction device, a smart home appliance, or the like. The server 102 may be one server, a server cluster formed by a plurality of servers, or any one of a cloud computing center or a virtualization center. This is not limited in the aspects described herein. The server 102 may be communicatively connected to the terminal device 101 through a wired network or a wireless network. The server 102 may have functions of data processing, data storage, data transmission and reception, and the like. This is not limited in the aspects described herein. The numbers of terminal devices 101 and servers 102 are not limited, and there may be one or more terminal devices 101 and one or more servers 102.

Exemplary implementations of this application may be implemented based on an artificial intelligence (AI) technology. AI involves a theory, a method, a technology, and an application system that use a digital computer or a machine controlled by the digital computer to simulate, extend, and expand human intelligence, perceive an environment, acquire knowledge, and use knowledge to obtain an optimal result. In other words, AI is a comprehensive technology in computer science, attempts to understand the essence of intelligence, and produce a new intelligent machine that can react in a manner similar to human intelligence. AI is to study the design principles and implementation methods of various intelligent machines to enable the machines to have the functions of perception, reasoning, and decision-making.

The AI technology is a comprehensive discipline and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, machine learning/deep learning, automatic driving, and intelligent transportation.

Figure 2:
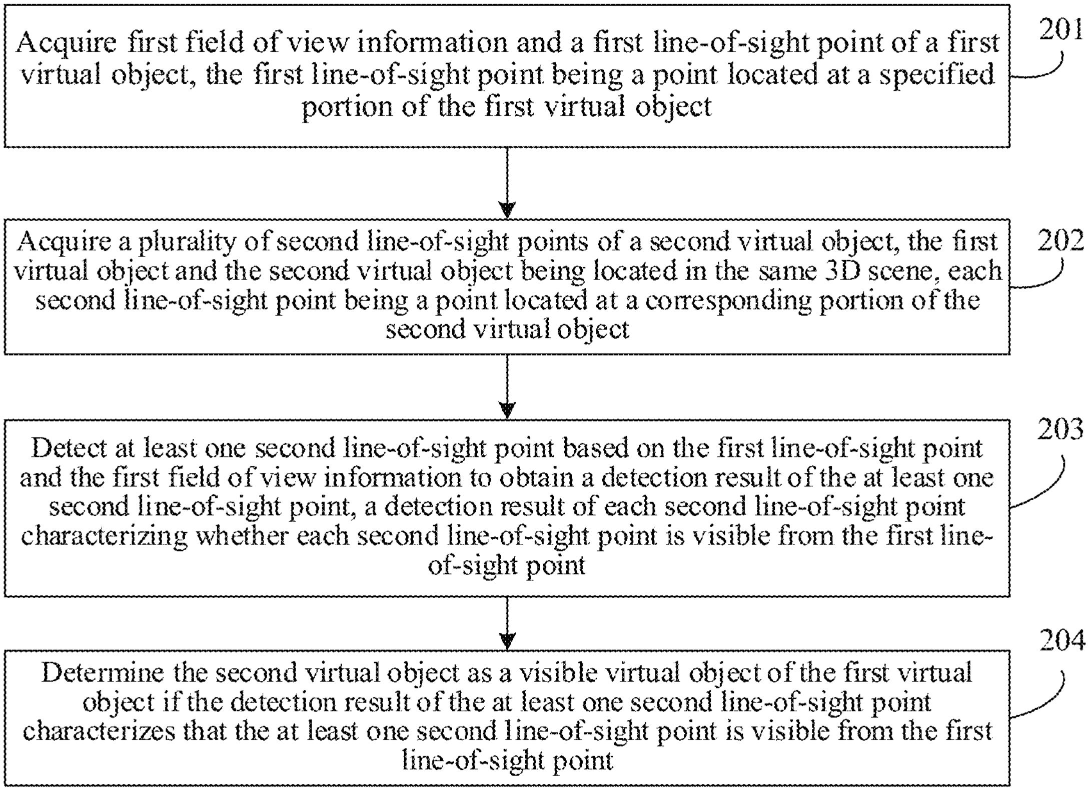
FIG. 2 is a flowchart of a data processing method according to one or more illustrative aspects described herein.

An aspect described herein provides a data processing method. The method may be applied to the above-mentioned implementation environment and may determine whether a virtual object is a visible virtual object of another virtual object, thereby improving the authenticity of field of view detection. Taking a flowchart of a data processing method according to an aspect described herein shown in FIG. 2 as an example, for the convenience of description, the terminal device 101 or the server 102 which performs the data processing method in the aspects described herein is referred to as an electronic device. The method may be performed by the electronic device. As shown in FIG. 2, the method includes the following operations.

Operation 201: acquire first field of view information and a first line-of-sight point of a first virtual object, the first line-of-sight point being a point located at a specified portion of the first virtual object. For example, the first virtual object is a 3D model in a 3D scene. For example, a position of the first line-of-sight point may be characterized by a coordinate value on a 3D coordinate axis. For example, the first field of view information is configured for characterizing a field of view range of the first virtual object. For example, the first field of view information uses the first line-of-sight point as a viewpoint. The first virtual object is a virtual object manipulated by a computer program. Generally, the virtual object manipulated by the computer program may be automatically driven based on a configured computer program and does not need to be manipulated by a player. Therefore, such a virtual object is also referred to as an NPC. That is, the first virtual object is an NPC.

The virtual object may be an object model of any object modeled by a 3D modeling technology. The object may be a real-world object, or may be a fictive object. A plurality of portions may be obtained by dividing the first virtual object in terms of an object structure. For example, if the first virtual object is a character model, the first virtual object may be divided into portions such as a head, a hand, a foot, and a torso in terms of a character structure. For any portion, a line-of-sight point may be bound at the portion, and no line-of-sight point may be bound at the portion. A line-of-sight point of a specified portion in the plurality of portions is recorded as the first line-of-sight point. For example, a line-of-sight point of the head is recorded as the first line-of-sight point.

Field of view information is provided for the first virtual object so that the first virtual object has a visual capability and may see another virtual object located in the same 3D scene (for example, a 3D scene of the same game battle) with the first virtual object. In the aspects described herein, any frame of game picture in the game battle may or may not include the first virtual object. For a current frame of game picture including the first virtual object, updated first field of view information of the first virtual object may be determined based on game data corresponding to the current frame of game picture.

In a possible implementation, "acquiring first field of view information of a first virtual object" in operation 201 includes operation 2021 to operation 2022 (not shown in the figure).

Operation 2021: acquire initial first field of view information of the first virtual object.

In the aspects described herein, initial field of view information may be configured for the first virtual object. For a first frame of game picture in the game battle, if the first virtual object satisfies a field of view update condition, the initial field of view information is updated, and updated field of view information is used as field of view information corresponding to the first frame of game picture. If the first virtual object does not satisfy the field of view update condition, the initial field of view information is used as the field of view information corresponding to the first frame of game picture. For a second frame of game picture in the game battle, if the first virtual object satisfies the field of view update condition, the field of view information corresponding to the first frame of game picture is updated, and updated field of view information is used as field of view information corresponding to the second frame of game picture. If the first virtual object does not satisfy the field of view update condition, the field of view information corresponding to the first frame of game picture is used as the field of view information corresponding to the second frame of game picture. By analogy, field of view information corresponding to a previous frame of game picture of the current frame of game picture may be obtained, and the field of view information corresponding to the previous frame of game picture is the initial first field of view information of the first virtual object. The manner of updating the field of view information may refer to the description of operation 2022. Details are not described herein again. Operation 2022: update the first field of view information to obtain updated first field of view information if the first virtual object satisfies a field of view update condition.

A perception component may be configured for the first virtual object, and field of view information of the first virtual object and an update method for the field of view information are encapsulated through the perception component. In a life cycle of the first virtual object, each time when the first virtual object satisfies the field of view update condition, the perception component is accessed through an interface to read and update field of view information, thereby implementing an AI perception component.

For the current frame of game picture, since the field of view information of the first virtual object is encapsulated in the perception component, the perception component may be accessed through the interface to read the first field of view information. Further, since the update method for the field of view information is encapsulated in the perception component, the first field of view information may be updated by accessing the perception component through the interface.

The perception component is accessed through the interface in a case that the first virtual object satisfies the field of view update condition. In one aspect, the first virtual object satisfying the field of view update condition includes at least one of a first case, a second case, and a third case. The first case is that: a height between an edge of a horizontal field of view of the first virtual object and a virtual ground satisfies a height condition. The second case is that: virtual weather in a virtual environment in which the first virtual object is located changes. The third case is that: a fight state of the first virtual object changes. The fight state characterizes whether the first virtual object fights with another virtual object. The first field of view information may be updated based on any one of implementation A, implementation B, and implementation C shown below.

Implementation A: the field of view update condition includes the first case. In this case, before operation 2022, operation A1 (not shown in the figure) is further included.

Operation A1: determine a height between an edge of a horizontal field of view and a virtual ground based on the first line-of-sight point and the first field of view information if the first virtual object is initialized or the first virtual object moves.

In a case that the first virtual object is initialized, i.e., in a case that the first virtual object is born or in a case that the first virtual object moves, a line trace detection may be performed based on the first line-of-sight point and the first field of view information to obtain the horizontal field of view. The horizontal field of view refers to: a field of view range on a horizontal plane of the first line-of-sight point corresponding to the first field of view information. For example, if the field of view range characterized by the first field of view information is a sphere using the first line-of-sight point a center, the horizontal field of view is a horizontal section of the sphere on which the first line-of-sight point is located.

Figure 3:
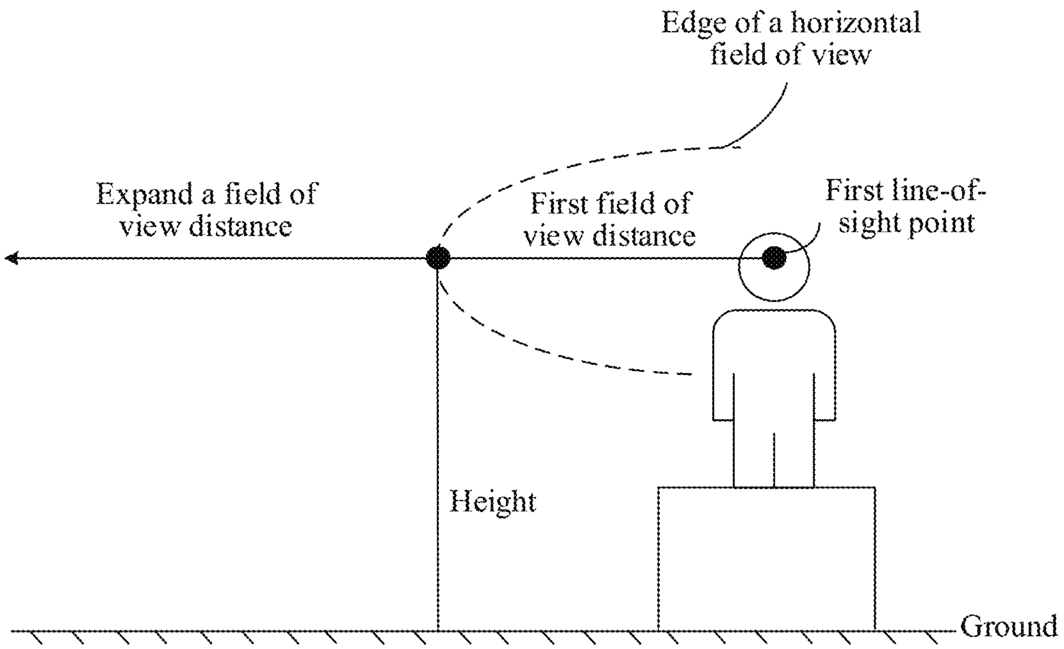
FIG. 3 is a schematic diagram of expanding a field of view distance according to one or more illustrative aspects described herein.

After the horizontal field of view is determined, an altitude of the horizontal field of view is determined. Game data corresponding to the current frame of game picture includes data of the virtual ground, and the data of the virtual ground may reflect an altitude of the virtual ground located below the horizontal field of view. The height between the edge of the horizontal field of view and the virtual ground may be determined through the altitude of the horizontal field of view and the altitude of the virtual ground located below the edge of the horizontal field of view. Referring to FIG. 3, in FIG. 3, the first field of view information may describe a sphere using the first line-of-sight point as a center and a first field of view distance as a radius, and the horizontal field of view is a horizontal section of the sphere on which the first line-of-sight point is located. After the horizontal field of view is determined, the height between the edge of the horizontal field of view and the ground may be determined.

In the aspects described herein, the first virtual object satisfying the field of view update condition includes the height satisfying the height condition. In this case, operation 2022 may include operation A2 (not shown in the figure).

Operation A2: update the first field of view information based on the height to obtain updated first field of view information. A field of view range corresponding to the first field of view information may be expanded based on the height, or the field of view range corresponding to the first field of view information may be zoomed out based on the height.

In a possible implementation, the height satisfying the height condition includes that the height is greater than a first height threshold. In this case, the first field of view information may be expanded based on the height.

The first height threshold is not limited in the aspects described herein. Illustratively, the first height threshold is set data. For example, the first height threshold is 300. Alternatively, each frame of game picture corresponds to a first height threshold. A reference height between the edge of the horizontal field of view and the virtual ground may be determined based on game data corresponding to the previous frame of game picture in the manner of operation A1, and the first height threshold corresponding to the current frame of game picture is determined based on the reference height. For example, the first height threshold is the reference height, or the first height threshold and the reference height satisfy a linear relationship.

In the aspects described herein, the first field of view information includes the first field of view distance, and the first field of view distance is a distance between the first line-of-sight point corresponding to the previous frame of game picture and the edge of the field of view. The first virtual object corresponds to a regular field of view (for example, the first virtual object corresponds to a spherical field of view) or an irregular field of view (for example, the first virtual object corresponds to at least one cone field of view). Based on this, there is at least one first field of view distance.

In one aspect, operation A2 includes operation A21 to operation A23 (not shown in the figure).

Operation A21: expand the first field of view distance based on the height to obtain a second field of view distance.

If a height of the current frame of game picture is greater than the first height threshold, the first field of view distance is expanded based on the height and the first field of view distance. In one aspect, the field of view distance is expanded according to a formula (1) shown below.

$$\text{Range2} = \text{Range1} + \text{Height} * w, \qquad \text{Formula (1)}$$

where Range2 characterizes the second field of view distance, Range1 characterizes the first field of view distance, Height characterizes the height, and w characterizes a weight. The value of the weight is not limited in the aspects described herein. Illustratively, w=1.5.

Operation A22: determine the updated first field of view information based on a first field of view threshold if the second field of view distance is greater than the first field of view threshold.

The first field of view threshold is not limited in the aspects described herein. Illustratively, the first field of view threshold is set data. For example, the first field of view threshold is 3,000. Alternatively, the first field of view threshold is determined based on the first field of view distance. For example, a difference between the first field of view threshold and the first field of view distance is not greater than the set data. For example, the difference between the first field of view threshold and the first field of view distance is not greater than 1,500.

If the second field of view distance is greater than the first field of view threshold, the first field of view distance in the first field of view information is replaced with the first field of view threshold to obtain the updated first field of view information.

Operation A23: determine the updated first field of view information based on the second field of view distance if the second field of view distance is not greater than the first field of view threshold.

If the second field of view distance is not greater than the first field of view threshold, the first field of view distance in the first field of view information is replaced with the second field of view distance to obtain the updated first field of view information.

Operation A21 to operation A23 are described below with reference to FIG. 3. If the height between the edge of the horizontal field of view and the ground is greater than the first height threshold, the field of view distance is expanded based on the first field of view distance. The higher the height, the greater the field of view distance. A maximum field of view distance does not exceed the first field of view threshold.

In the aspects described herein, the first field of view distance in the first field of view information is replaced with the second field of view distance or the first field of view threshold, and the second field of view distance and the first field of view threshold are both greater than the first field of view distance so that the first field of view information is expanded, and the purpose of standing high to see far is realized. The realistic biological vision is simulated and the authenticity is improved by ensuring that the maximum field of view distance does not exceed the first field of view threshold.

In another possible implementation, the height satisfying the height condition includes that the height is less than a second height threshold. In this case, the first field of view information may be zoomed out based on the height. In one aspect, the second height threshold is less than or equal to the first height threshold.

The first height threshold is not limited in the aspects described herein. Illustratively, the first height threshold is set data. For example, the first height threshold is 300. Alternatively, each frame of game picture corresponds to a first height threshold. A reference height between the edge of the horizontal field of view and the virtual ground may be determined based on game data corresponding to the previous frame of game picture in the manner of operation A1, and the first height threshold corresponding to the current frame of game picture is determined based on the reference height. For example, the first height threshold is the reference height, or the first height threshold and the reference height satisfy a linear relationship.

In the aspects described herein, the first field of view information includes the first field of view distance. In one aspect, operation A2 includes operation A24 to operation A26 (not shown in the figure).

Operation A24: zoom out the first field of view distance based on the height to obtain a third field of view distance.

If the height of the current frame of game picture is less than the second height threshold, the first field of view distance is zoomed out based on the height and the first field of view distance. In one aspect, the field of view distance is zoomed out according to a formula (2) shown below.

$$\text{Range3} = \text{Range1} - \text{Height} * w, \qquad \text{Formula (2)}$$

where Range3 characterizes the third field of view distance, Range1 characterizes the first field of view distance, Height characterizes the height, and w characterizes a weight. The value of the weight is not limited in the aspects described herein. Illustratively, w=1.5.

Operation A25: determine the updated first field of view information based on a second field of view threshold if the third field of view distance is less than the second field of view threshold.

In one aspect, the second field of view threshold is less than the first field of view threshold. The second field of view threshold is not limited in the aspects described herein. Illustratively, the second field of view threshold is set data. For example, the second field of view threshold is 1,000. Alternatively, the second field of view threshold is determined based on the first field of view distance. For example, a difference between the second field of view threshold and the first field of view distance is not less than the set data. For example, the difference between the second field of view threshold and the first field of view distance is not less than 400.

If the third field of view distance is less than the second field of view threshold, the first field of view distance in the first field of view information is replaced with the second field of view threshold to obtain the updated first field of view information.

Operation A26: determine the updated first field of view information based on the third field of view distance if the third field of view distance is not less than the second field of view threshold.

If the third field of view distance is not less than the second field of view threshold, the first field of view distance in the first field of view information is replaced with the third field of view distance to obtain the updated first field of view information.

In the aspects described herein, the first field of view distance in the first field of view information is replaced with the third field of view distance or the second field of view threshold, and the third field of view distance and the second field of view threshold are both less than the first field of view distance so that the first field of view information is zoomed out, and the purpose of standing low to see close is realized. The realistic biological vision is simulated and the authenticity is improved by ensuring that a minimum field of view distance does not exceed the second field of view threshold.

Implementation B: the field of view update condition includes the second case. In this case, operation 2022 includes operation B1 to operation B2 (not shown in the figure).

Operation B1: acquire change information of the virtual weather.

The game data corresponding to the current frame of game picture includes data of the virtual weather, and the game data corresponding to the previous frame of game picture also includes the data of the virtual weather. The data of the virtual weather is configured for describing the virtual weather. Generally, the virtual weather may include any type of weather such as sunny, rainy, foggy, and snowy, and there is a difference in visibility of any two types of weather. The visibility refers to a maximum distance at which a target object is recognized from the background. For example, visibility on a sunny day is higher than visibility on a rainy day, a foggy day, and a snowy day.

If the data of the virtual weather corresponding to the current frame of game picture is the same as the data of the virtual weather corresponding to the previous frame of game picture, it is determined that the virtual weather does not change. If the data of the virtual weather corresponding to the current frame of game picture is different from the data of the virtual weather corresponding to the previous frame of game picture, it is determined that the virtual weather changes. In this case, it may be determined that the first virtual object satisfies the field of view update condition.

Difference information may be determined based on the data of the virtual weather corresponding to the current frame of game picture and the data of the virtual weather corresponding to the previous frame of game picture. The difference information corresponds to the change information of the virtual weather. For example, the data of the virtual weather corresponding to the previous frame of game picture is configured for describing a sunny day, and the data of the virtual weather corresponding to the current frame of game picture is configured for describing a rainy day. Therefore, the difference information corresponds to change information of the virtual weather changing from the sunny day to the rainy day.

Operation B2: zoom out a field of view range corresponding to the first field of view information to obtain the updated first field of view information characterizing a zoomed-out field of view range if the change information of the virtual weather characterizes a decrease in visibility; and expand the field of view range corresponding to the first field of view information to obtain the updated first field of view information characterizing an expanded field of view range if the change information of the virtual weather characterizes an increase in visibility.

Change information of the visibility may be determined based on the change information of the virtual weather. The change information of the visibility includes a decrease in visibility and an increase in visibility.

If the change information of the visibility reflects a decrease in visibility, the first field of view distance in the first field of view information is zoomed out to obtain the third field of view distance. The first field of view distance in the first field of view information is replaced with the third field of view distance to obtain the updated first field of view information. Alternatively, if the third field of view distance is less than the second field of view threshold, the first field of view distance in the first field of view information is replaced with the second field of view threshold to obtain the updated first field of view information. If the third field of view distance is not less than the second field of view threshold, the first field of view distance in the first field of view information is replaced with the third field of view distance to obtain the updated first field of view information. In this manner, the first field of view information is zoomed out.

If the change information of the visibility reflects an increase in visibility, the first field of view distance in the first field of view information is expanded to obtain the second field of view distance. The first field of view distance in the first field of view information is replaced with the second field of view distance to obtain the updated first field of view information. Alternatively, if the second field of view distance is greater than the first field of view threshold, the first field of view distance in the first field of view information is replaced with the first field of view threshold to obtain the updated first field of view information. If the second field of view distance is not greater than the first field of view threshold, the first field of view distance in the first field of view information is replaced with the second field of view distance to obtain the updated first field of view information. In this manner, the first field of view information is expanded.

In the aspects described herein, if the visibility of the virtual environment in which the first virtual object is located increases, the field of view range corresponding to the first field of view information is expanded. If the visibility of the virtual environment in which the first virtual object is located decreases, the field of view range corresponding to the first field of view information is zoomed out. The field of view information of the first virtual object is updated in time through the change information of the virtual weather, thereby simulating the realistic biological vision and improving the authenticity.

Implementation C: the field of view update condition includes the third case. The third case is that: the fight state of the first virtual object changes.

The game data corresponding to the current frame of game picture includes data of the first virtual object, and the game data corresponding to the previous frame of game picture also includes the data of the first virtual object. The data of the first virtual object is configured for describing the first virtual object. Whether the first virtual object fights with another virtual object may be determined through the data of the first virtual object corresponding to the current frame of game picture to obtain the fight state of the first virtual object corresponding to the current frame of game picture. Similarly, whether the first virtual object fights with another virtual object may be determined through the data of the first virtual object corresponding to the previous frame of game picture to obtain the fight state of the first virtual object corresponding to the previous frame of game picture. The fight state of the first virtual object corresponding to any frame of game picture may be determined using the following operation C1 to operation C2 (not shown in the figure).

In one aspect, the first field of view information includes first-level field of view information, second-level field of view information, and third-level field of view information. A first field of view range corresponding to the first-level field of view information includes a second field of view range corresponding to the second-level field of view information, and the second field of view range includes a third field of view range corresponding to the third-level field of view information.

The field of view information at any level is configured for describing a field of view range corresponding to the level. The field of view range corresponding to any level is not limited in the aspects described herein. Illustratively, the field of view range corresponding to any level includes a range of at least one piece of solid geometry of a cone, a sphere, a cylinder, a polyhedron, and the like.

Figure 4:
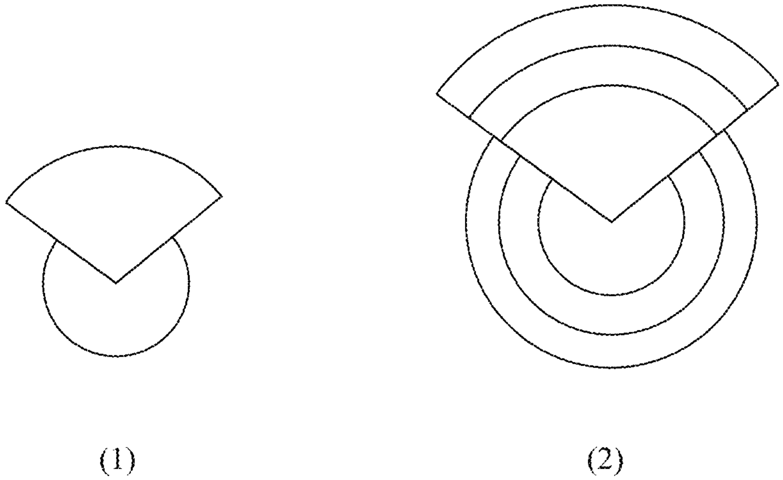
FIG. 4 is a schematic diagram of first field of view information according to one or more illustrative aspects described herein.

Referring to (1) in FIG. 4, (1) in FIG. 4 shows a horizontal field of view range corresponding to one level. The horizontal field of view range includes two sectors. An angle of a first sector is less than 180 degrees, and an angle of a second sector is greater than 180 degrees. A radius of the first sector is greater than a radius of the second sector, and the two sectors have the same sector center. Any sector may be a horizontal cross section of a spherical cone. Based on this, the field of view range corresponding to the level includes ranges of spherical cones corresponding to the two sectors.

An i-th-level field of view information corresponds to an i-th field of view range, and i is any one of one to three. The first field of view range includes the second field of view range, and the second field of view range includes the third field of view range. As shown in (2) in FIG. 4, (2) in FIG. 4 shows field of view ranges corresponding to three levels. The field of view range corresponding to one level is shown as (1) in FIG. 4. The field of view ranges corresponding to three levels shown in (2) in FIG. 4 sequentially correspond from outside to inside: the first field of view range corresponding to the first-level field of view information, the second field of view range corresponding to the second-level field of view information, and the third field of view range corresponding to the third-level field of view information. The first field of view range includes the second field of view range, and the second field of view range includes the third field of view range.

In the aspects described herein, the field of view information at any level includes at least one piece of sub-field of view information. The field of view range corresponding to any level includes a range of at least one piece of solid geometry, and any piece of solid geometry is at least one piece of solid geometry. One piece of sub-field of view information is configured for describing a range of one piece of solid geometry. That is, the first field of view information includes a plurality of pieces of sub-field of view information. A plurality of sub-perception components may be configured for the first virtual object, and one piece of sub-field of view information is encapsulated through one sub-perception component. In this way, it is beneficial to separately configure the sub-field of view information. The perception component may invoke the sub-field of view information encapsulated by the sub-perception components to summarize the sub-field of view information.

In the aspects described herein, the method further includes operation C1 to operation C2. Operation C1 to operation C2 are performed before operation C3.

Operation C1: determine that the fight state is a first state if there is the visible virtual object within the third field of view range, or there is the visible virtual object within other field of view ranges except the third field of view range within the second field of view range and the visible virtual object is in a first posture, the first state characterizing that the first virtual object fights with another virtual object.

For the current frame of game picture or the previous frame of game picture, whether there is the visible virtual object within any field of view range may be determined in a manner of operation 201 to operation 204.

In the aspects described herein, the third level corresponds to a fight level. If there is the visible virtual object located in the fight level of the first virtual object, there is the visible virtual object within the third field of view range, and it may be determined that the fight state of the first virtual object is the first state. The first state characterizes that the first virtual object fights with another virtual object.

The second level corresponds to a stealth level. If no visible virtual object is located in the fight level of the first virtual object, but there is the visible virtual object located outside the fight level of the first virtual object, and the visible virtual object is located in the stealth level, a posture of the visible virtual object needs to be detected. In one aspect, posture data of the visible virtual object may be acquired. The posture data of the visible virtual object is configured for describing the posture of the visible virtual object. Generally, the posture of the visible virtual object includes any one of postures such as a prone posture, a crouching posture, and a standing posture. If the posture data of the visible virtual object describes that the visible virtual object is in the standing posture, it is determined that the fight state of the first virtual object is the first state, and the first state characterizes that the first virtual object fights with another virtual object.

Operation C2: determine that the fight state is a second state if there is the visible virtual object within other field of view ranges except the third field of view range within the second field of view range and the visible virtual object is in a second posture, or there is the visible virtual object within other field of view ranges except the second field of view range within the first field of view range, the second state characterizing that the first virtual object does not fight with another virtual object.

If no visible virtual object is located in the fight level of the first virtual object, but there is the visible virtual object located outside the fight level of the first virtual object, and the visible virtual object is located in the stealth level, the posture data of the visible virtual object may be acquired. If the posture data of the visible virtual object describes that the visible virtual object is in the prone posture, it is determined that the fight state of the first virtual object is the second state, and the second state characterizes that the first virtual object does not fight with another virtual object.

If the posture data of the visible virtual object describes that the visible virtual object is in the crouching posture, it is determined that the fight state of the first virtual object is the first state or the second state. The first state characterizes that the first virtual object fights with another virtual object, and the second state characterizes that the first virtual object does not fight with another virtual object.

The first level corresponds to a vigilance level. If no visible virtual object is located in the fight level of the first virtual object and no visible virtual object is located in the stealth level of the first virtual object, but there is the visible virtual object located outside the stealth level, and the visible virtual object is located in the vigilance level, there is the visible virtual object within the first field of view range, and it may be determined that the fight state of the first virtual object is the second state. The second state characterizes that the first virtual object does not fight with another virtual object.

According to operation C1 to operation C2, the fight state of the first virtual object corresponding to the previous frame of game picture and the fight state of the first virtual object corresponding to the current frame of game picture may be determined. If the fight state of the first virtual object corresponding to the current frame of game picture is the same as the fight state of the first virtual object corresponding to the previous frame of game picture, it is determined that the fight state of the first virtual object does not change. If the fight state of the first virtual object corresponding to the current frame of game picture is different from the fight state of the first virtual object corresponding to the previous frame of game picture, it is determined that the fight state of the first virtual object changes. In this case, it may be determined that the first virtual object satisfies the field of view update condition. In one aspect, operation 2022 includes operation C3 (not shown in the figure).

Operation C3: zoom out the first field of view information to obtain the updated first field of view information if a changed fight state characterizes that the first virtual object fights with another virtual object; and expand the first field of view information to obtain the updated first field of view information if the changed fight state characterizes that the first virtual object does not fight with another virtual object.

In a case that the fight state of the first virtual object changes, if the fight state of the first virtual object corresponding to the previous frame of game picture is that: the first virtual object fights with another virtual object, the fight state of the first virtual object corresponding to the current frame of game picture is that: the first virtual object does not fight with another virtual object. If the fight state of the first virtual object corresponding to the previous frame of game picture is that: the first virtual object does not fight with another virtual object, the fight state of the first virtual object corresponding to the current frame of game picture is that: the first virtual object fights with another virtual object. The first field of view information may be updated based on the fight state of the first virtual object corresponding to the current frame of game picture.

If the fight state (i.e., the changed fight state) of the first virtual object corresponding to the current frame of game picture is that: the first virtual object does not fight with another virtual object, the first field of view distance in the first field of view information is expanded to obtain the second field of view distance. The first field of view distance in the first field of view information is replaced with the second field of view distance to obtain the updated first field of view information. Alternatively, if the second field of view distance is greater than the first field of view threshold, the first field of view distance in the first field of view information is replaced with the first field of view threshold to obtain the updated first field of view information. If the second field of view distance is not greater than the first field of view threshold, the first field of view distance in the first field of view information is replaced with the second field of view distance to obtain the updated first field of view information. In this manner, the first field of view information is expanded.

If the fight state (i.e., the changed fight state) of the first virtual object corresponding to the current frame of game picture is that: the first virtual object fights with another virtual object, the first field of view distance in the first field of view information is zoomed out to obtain the third field of view distance. The first field of view distance in the first field of view information is replaced with the third field of view distance to obtain the updated first field of view information. Alternatively, if the third field of view distance is less than the second field of view threshold, the first field of view distance in the first field of view information is replaced with the second field of view threshold to obtain the updated first field of view information. If the third field of view distance is not less than the second field of view threshold, the first field of view distance in the first field of view information is replaced with the third field of view distance to obtain the updated first field of view information. In this manner, the first field of view information is zoomed out.

In the aspects described herein, the field of view information of the first virtual object may be flexibly changed based on the fight state of the first virtual object. When the first virtual object fights with another virtual object, the field of view distance is small so that the field of view of the first virtual object is focused in a fight scene. When the first virtual object does not fight with another virtual object, the field of view distance is large so that the field of view of the first virtual object focuses on observation, thereby improving the intelligence of the first virtual object.

If the first virtual object does not satisfy the field of view update condition, the first field of view information corresponding to the previous frame of game picture may be used as the updated first field of view information corresponding to the current frame of game picture.

Operation 202: acquire a plurality of second line-of-sight points of a second virtual object, the first virtual object and the second virtual object being located in the same 3D scene, and each second line-of-sight point being a point located at a corresponding portion of the second virtual object.

Initializing a virtual object is equivalent to the birth of the virtual object. Each time a virtual object is initialized, a perception system registers the virtual object as a member in a sight query queue. In an entire life cycle from birth to destruction of the virtual object, the virtual object is a member in the sight query queue.

Any other virtual object except the first virtual object that is in the same game battle with the first virtual object may be used as the second virtual object. Alternatively, a position of any other virtual object may be acquired. If it is determined, based on the position of another virtual object, that the another virtual object is located within the field of view range corresponding to the updated first field of view information of the first virtual object, the another virtual object is used as the second virtual object. There is at least one second virtual object. Any second virtual object may be an NPC, or may be a PC. The PC is a virtual object manipulated by the player.

The second virtual object may be an object model obtained by modeling an object through a 3D modeling technology. The object may be a real object or a fictive object. For example, the second virtual object may be a character model, a bird model, a sprite model, and the like. One second virtual object has a plurality of portions. One portion may correspond to one second line-of-sight point, or may not correspond to the second line-of-sight point. Any two second line-of-sight points are located on different portions of the second virtual object. For example, the second virtual object includes portions such as a head, a shoulder, a hand, a knee, and a leg. There is one second line-of-sight point on each of the head, the hand, and the leg. Therefore, the second virtual object has five second line-of-sight points in total.

Operation 203: detect at least one second line-of-sight point based on the first line-of-sight point and the first field of view information to obtain a detection result of the at least one second line-of-sight point, a detection result of each second line-of-sight point characterizing whether each second line-of-sight point is visible from the first line-of-sight point. The second line-of-sight point being visible from the first line-of-sight point may be understood as that the second line-of-sight point is visible to the first virtual. The second line-of-sight point being invisible from the first line-of-sight point may be understood as that the second line-of-sight point is invisible to the first virtual object.

Operation 204: determine the second virtual object as a visible virtual object of the first virtual object if the detection result of the at least one second line-of-sight point characterizes that the at least one second line-of-sight point is visible from the first line-of-sight point.

In some aspects, in this aspect described herein, before operation 204 is performed, the following operation may be further performed: determining whether each of the plurality of second line-of-sight points needs to be detected, the detection being configured for determining whether each second line-of-sight point is visible from the first line-of-sight point.

Operation 204 is performed when the at least one second line-of-sight point needs to be detected. When it is determined that the detection does not need to be performed, the operation of determining whether each of the plurality of second line-of-sight points needs to be detected is continued until at least one second line-of-sight point needs to be detected. In some aspects, whether each of the plurality of second line-of-sight points needs to be detected may be determined by determining whether the second line-of-sight points satisfy a target detection condition. In a case that any second line-of-sight point satisfies the target detection condition, if a connecting line between any second line-of-sight point and the first line-of-sight point is located within the field of view range corresponding to the updated first field of view information, the second line-of-sight point is located within the field of view range. If the connecting line does not pass through a non-transparent object, a light ray may reach the second line-of-sight point from the first line-of-sight point. In this case, the second line-of-sight point is visible at the first line-of-sight point, which is equivalent to that the first virtual object may see a portion where the second line-of-sight point is located on the second virtual object. The connecting line not passing through the non-transparent object includes that the connecting line passes through a transparent object (for example, the connecting line passes through a transparent object such as glass) and the connecting line does not pass through any object.

If the connecting line between any second line-of-sight point and the first line-of-sight point is located outside the field of view range corresponding to the updated first field of view information, the second line-of-sight point is located outside the field of view range. In this case, the second line-of-sight point is invisible from the first line-of-sight point. If the connecting line between any second line-of-sight point and the first line-of-sight point passes through the non-transparent object, the light ray cannot reach the second line-of-sight point from the first line-of-sight point. In this case, the second line-of-sight point is also invisible at the first line-of-sight point. If the connecting line between a second line-of-sight point and the first line-of-sight point is located outside the field of view range corresponding to the updated first field of view information and the connecting line passes through the non-transparent object, the second line-of-sight point is invisible at the first line-of-sight point. The second line-of-sight point is invisible at the first line-of-sight point, which is equivalent to that the first virtual object cannot see the portion where the second line-of-sight point is located on the second virtual object.

In the aspects described herein, there is at least one second virtual object. In a possible implementation, the operation of "determining whether the second line-of-sight points satisfy a target detection condition" includes operation 2031 to operation 2033 (not shown in the figure).

Operation 2031: acquire detection priorities of the second virtual objects and detection priorities of the second line-of-sight points.

Since there is at least one second virtual object in the game battle, the detection priorities of the second virtual object may be determined. A detection priority of any second virtual object may reflect an order of performing a line trace detection on the second virtual object. The higher the detection priority of the second virtual object, the more preferential the line trace detection is performed on the second virtual object. That is, the detection priority of the second virtual object is positively correlated to the order of performing the line trace detection on the second virtual object.

In one aspect, the updated first field of view information includes a plurality of pieces of sub-field of view information. In the aspects described herein, the updated first field of view information is the first field of view information or is obtained by updating the first field of view information. Therefore, the updated first field of view information also includes the first-level field of view information, the second-level field of view information, and the third-level field of view information. In addition, the first field of view range includes the second field of view range, and the second field of view range includes the third field of view range.

The field of view range corresponding to any level includes a range of at least one piece of solid geometry of a cone, a sphere, a cylinder, a polyhedron, and the like. Any piece of solid geometry is at least one piece of solid geometry. In the aspects described herein, one piece of sub-field of view information is configured for describing a range of a piece of solid geometry. For example, (1) in FIG. 4 corresponds to two pieces of sub-field of view information. One piece of sub-field of view information describes a range of a spherical cone corresponding to a sector whose angle is less than 180 degrees, and the other piece of sub-field of view information describes a range of a spherical cone corresponding to a sector whose angle is greater than 180 degrees. Similarly, (2) in FIG. 4 has six sectors in total, corresponding to six pieces of sub-field of view information in total. One piece of sub-field of view information describes a range of a spherical cone corresponding to one sector.

In an exemplary aspect, "acquiring detection priorities of the second virtual object" in operation 2031 includes: determining, for any second virtual object, sub-field of view information of the any second virtual object based on a position of the any second virtual object; and determining a detection priority of the any second virtual object based on a distance between the first virtual object and the any second virtual object and the sub-field of view information of the any second virtual object.

A direction of the second virtual object relative to the first virtual object and a distance between the second virtual object and the first virtual object may be determined based on a position of any second virtual object and a position of the first virtual object. For any piece of sub-field of view information, whether the direction is located within a sub-field of view angle corresponding to the sub-field of view information is determined, and whether the distance is not greater than a sub-field of view distance corresponding to the sub-field of view information is determined. If the direction is located in the sub-field of view angle corresponding to the sub-field of view information, and the distance is not greater than the sub-field of view distance corresponding to the sub-field of view information, it is determined that the second virtual object corresponds to the sub-field of view information. If the direction is not located in the sub-field of view angle corresponding to the sub-field of view information, and/or the distance is greater than the sub-field of view distance corresponding to the sub-field of view information, it is determined that the second virtual object does not correspond to the sub-field of view information.

Generally, one second virtual object corresponds to one piece of sub-field of view information. If there is the second virtual object corresponding to a plurality of pieces of sub-field of view information, any one piece of sub-field of view information is determined from these pieces of sub-field of view information (for example, sub-field of view information whose sub-field of view distance is the maximum or the minimum is determined), and the sub-field of view information is used as the sub-field of view information corresponding to the second virtual object.

For any second virtual object, a distance between the first virtual object and the second virtual object may be determined based on the position of the second virtual object and the position of the first virtual object. The detection priority of the second virtual object is determined based on the distance and the sub-field of view distance included in the sub-field of view information of the second virtual object.

In one aspect, the distance (which may be recorded as L1) between the first virtual object and any second virtual object is divided by the sub-field of view distance (which may be recorded as L2) included in the sub-field of view information of the second virtual object, i.e., calculating L1/L2, to obtain a score of the second virtual object, the importance of the second virtual object relative to the first virtual object is reflected through the score of the second virtual object. Scores of the second virtual objects are sorted, and the detection priorities of the second virtual objects are determined based on a sorting result. For example, the scores of the second virtual objects are sorted from largest to smallest, and sorting sequence numbers of the second virtual objects are the detection priorities of the second virtual objects. That is, if the sorting sequence number of the second virtual object is the first (i.e., the score is the highest), the detection priority of the second virtual object is the highest. If the sorting sequence number of the second virtual object is the second (i.e., the score is the second highest), the detection priority of the second virtual object is the second. The rest may be deduced by analogy. That is, the score of the second virtual object is positively correlated to the detection priority of the second virtual object.

For any second virtual object, since the second virtual object includes a plurality of second line-of-sight points, the detection priorities of the second line-of-sight points may be determined. The detection priority of any second line-of-sight point may reflect an order of performing line trace detection on the second line-of-sight point. The higher the detection priority of the second line-of-sight point, the more preferential the line trace detection is performed on the second line-of-sight point. That is, the detection priority of the second line-of-sight point is positively correlated to the order of performing the line trace detection on the second line-of-sight point.

In one aspect, for one second virtual object, the detection priorities of the second line-of-sight points included in the second virtual object may be set. For example, if one second virtual object includes five second line-of-sight points located on a head, two hands, and two feet, it may be set that: a detection priority of a second line-of-sight point located on the head is higher than a detection priority of a second line-of-sight point located on the left hand portion, the detection priority of the second line-of-sight point located on the left hand portion is higher than a detection priority of a second line-of-sight point located on the right hand portion, the detection priority of the second line-of-sight point located on the right hand portion is higher than a detection priority of a second line-of-sight point located on the left foot portion, and the detection priority of the second line-of-sight point located on the left foot portion is higher than a detection priority of a second line-of-sight point located on the right foot portion.

Operation 2032: acquire a current detection count for any second line-of-sight point, where the current detection count is a sum of a count of first detections and a count of second detections; the first detection is a detection performed on a second line-of-sight point of a second virtual object whose detection priority is located before a detection priority of a second virtual object of the any second line-of-sight point, and the second detection is a detection performed on a second line-of-sight point whose detection priority is located before a detection priority of the any second line-of-sight point on the second virtual object of the any second line-of-sight point.

Before a line trace detection is performed on any second line-of-sight point included in any second virtual object, the count of first detections may be acquired. The first detection refers to a detection performed on a second line-of-sight point of a second virtual object whose detection priority is located before the detection priority of the second virtual object. For example, a detection priority of a second virtual object A is higher than a detection priority of a second virtual object B, the detection priority of the second virtual object B is higher than a detection priority of a second virtual object C, and the second virtual objects A to C each include second line-of-sight points 1 to 5. Before a line trace detection is performed on the second line-of-sight point 4 included in the second virtual object C, a count (a maximum count is 5) of line trace detections performed on the second line-of-sight points 1 to 5 included in the second virtual object A and a count (a maximum count is 5) of line trace detections performed on the second line-of-sight points 1 to 5 included in the second virtual object B may be acquired, thereby obtaining the count of first detections. The count of first detections is less than or equal to 10.

In addition, the count of second detections further may be acquired. The second detection refers to a detection performed on a second line-of-sight point whose detection priority is located before a detection priority of the second line-of-sight point on the second virtual object. For example, the second virtual object C includes second line-of-sight points 1 to 5, a detection priority of the second line-of-sight point 1 is higher than a detection priority of the second line-of-sight point 2, the detection priority of the second line-of-sight point 2 is higher than a detection priority of the second line-of-sight point 3, the detection priority of the second line-of-sight point 3 is higher than a detection priority of the second line-of-sight point 4, and the detection priority of the second line-of-sight point 4 is higher than a detection priority of the second line-of-sight point 5. Therefore, before the line trace detection is performed on the second line-of-sight point 4 included in the second virtual object C, a count (i.e., three times) of line trace detections performed on the second line-of-sight points 1 to 3 included in the second virtual object C may be acquired so that the count of second detections is 3.

The count of first detections and the count of second detections are added to obtain the current detection count.

Operation 2033: determine that any second line-of-sight point satisfies the target detection condition if the current detection count is less than a detection count threshold.

The detection count threshold may be set. Before the line trace detection is performed on any second line-of-sight point included in any second virtual object, a relationship between the current detection count and the detection count threshold may be determined. If the current detection count is less than the detection count threshold, it is determined that the second line-of-sight point satisfies the target detection condition, and the line trace detection may be performed on the second line-of-sight point. If the current detection count is not less than the detection count threshold, it is determined that the second line-of-sight point does not satisfy the target detection condition, and the line trace detection is not performed on the second line-of-sight point.

Figure 5:
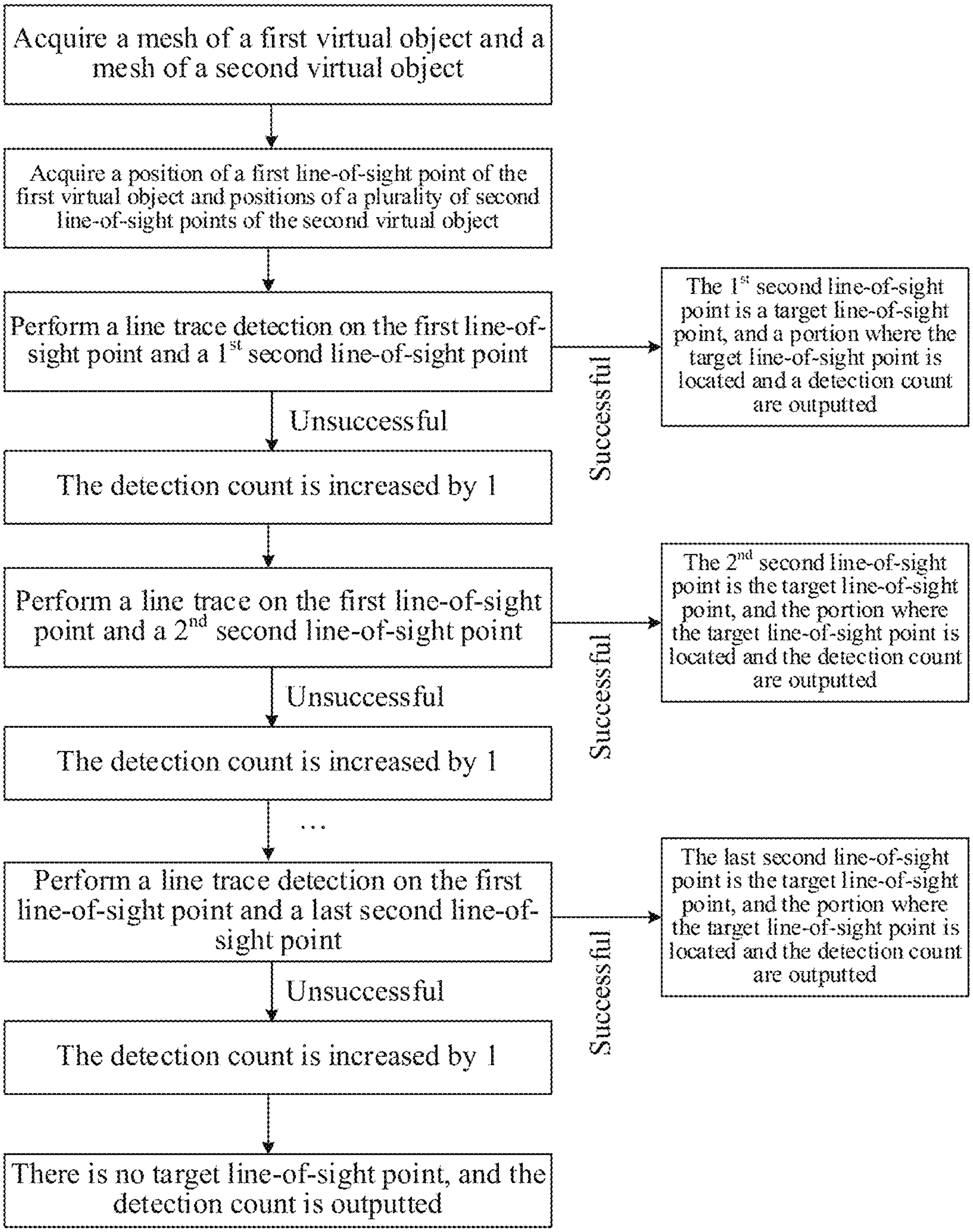
FIG. 5 is a flowchart of a line trace detection according to one or more illustrative aspects described herein.

Referring to FIG. 5, FIG. 5 is a flowchart of a line trace detection according to an aspect described herein. First, a mesh of the first virtual object and a mesh of the second virtual object are acquired. The mesh of the virtual object refers to a model of the virtual object. The first virtual object includes a first line-of-sight point located at a specified portion of the mesh, and a position of the first line-of-sight point may be acquired. The second virtual object includes second line-of-sight points located at a plurality of portions of the mesh, and positions of the second line-of-sight points may be acquired.

Then, the line trace detection is performed on the first line-of-sight point and a 1$^{st}$ second line-of-sight point. If a successful hit occurs, the 1$^{st}$ second line-of-sight point is determined as a target line-of-sight point, and a portion where the target line-of-sight point is located and a detection count are outputted. In this case, a procedure of the line trace detection may be ended or continued. The successful hit herein refers to that: the second line-of-sight point is visible at the first line-of-sight point. If an unsuccessful hit occurs, the detection count is increased by 1. The unsuccessful hit herein refers to that: the second line-of-sight point is invisible at the first line-of-sight point.

Next, the line trace detection is performed on the first line-of-sight point and a 2$^{nd}$ second line-of-sight point. If a successful hit occurs, the 2$^{nd}$ second line-of-sight point is determined as a target line-of-sight point, and a portion where the target line-of-sight point is located and a detection count are outputted. In this case, a procedure of the line trace detection may be ended or continued. If an unsuccessful hit occurs, the detection count is increased by 1. The rest may be deduced by analogy. Until, the line trace detection is performed on the first line-of-sight point and the last second line-of-sight point. If a successful hit occurs, the last second line-of-sight point is determined as a target line-of-sight point, and a portion where the target line-of-sight point is located and a detection count are outputted. If an unsuccessful hit occurs, the detection count is increased by 1, it is determined that there is no target line-of-sight point, and the detection count is outputted.

If there is a target line-of-sight point, the first virtual object may see a portion of the target line-of-sight point on the second virtual object. If there is no target line-of-sight point, the first virtual object cannot see the second virtual object.

Before the line trace detection is performed on any second line-of-sight point, whether the current detection count is less than the detection count threshold may be determined. If the current detection count is less than the detection count threshold, the line trace detection on the second line-of-sight point is continued. If the current detection count is not less than the detection count threshold, the line trace detection is not performed on the second line-of-sight point, that is, the procedure of the line trace detection is ended.

For example, if the current detection count is less than the detection count threshold, the line trace detection is performed on the first line-of-sight point and the 1$^{st}$ second line-of-sight point. Next, the detection count is increased by 1, the current detection count is equal to the detection count threshold, and the line trace detection is not performed on the first line-of-sight point and the 2$^{nd}$ second line-of-sight point. Similarly, the line trace detection is not performed on the first line-of-sight point and the last second line-of-sight point.

Setting the detection count threshold is equivalent to setting a maximum count of line trace detections corresponding to the current frame of game picture. Since performing the line trace detection takes a period of time, the period of time for the line trace detection may be restricted through the detection count threshold, thereby reducing a phenomenon of game lag.

It has been mentioned above that the updated first field of view information includes a plurality of pieces of sub-field of view information. In a possible implementation, "detecting at least one second line-of-sight point based on the first line-of-sight point and the first field of view information to obtain a detection result of the at least one second line-of-sight point" in operation 203 includes operation 2034 to operation 2035 (not shown in the figure).

Operation 2034: determine that the detection result of the at least one second line-of-sight point is a first result if a first detection condition and a second detection condition are satisfied, where the first result characterizes that at least one second line-of-sight point is visible to the first virtual object, the first detection condition is that a connecting line between the first line-of-sight point and the at least one second line-of-sight point is located within a field of view range corresponding to at least one piece of sub-field of view information, and the second detection condition is that the connecting line does not pass through a non-transparent object.

The connecting line between the first line-of-sight point and the second line-of-sight point may be determined based on a position of the at least one second line-of-sight point and a position of the first line-of-sight point. The connecting line corresponds to one direction. For any piece of sub-field of view information, whether the direction is located within the sub-field of view angle corresponding to the sub-field of view information is determined. If the direction is located in the sub-field of view angle corresponding to the sub-field of view information, it is determined whether the connecting line is located within the field of view range corresponding to the sub-field of view information. If the connecting line is located within the field of view range corresponding to the sub-field of view information, the connecting line is located within the field of view range corresponding to the updated first field of view information. That is, the second line-of-sight point is located within the field of view range of the first virtual object. In this case, it is determined that the first detection condition is satisfied.

That is, as long as there is a piece of sub-field of view information to make a direction of the connecting line between the first line-of-sight point and the at least one second line-of-sight point located in a sub-field of view angle corresponding to the sub-field of view information and the connecting line located within the field of view range corresponding to the sub-field of view information, it is determined that the first detection condition is satisfied. Otherwise, it is determined that the first detection condition is not satisfied.

If the connecting line does not pass through a non-transparent object, a light ray may reach the second line-of-sight point from the first line-of-sight point. In this case, it is determined that the second detection condition is satisfied.

If the first detection condition is satisfied, the second line-of-sight point is located within the field of view range corresponding to the updated first field of view information of the first virtual object. Based on this, if the second detection condition is satisfied, the light ray may reach the second line-of-sight point from the first line-of-sight point. That is, the first virtual object may see a portion of the second line-of-sight point on the second virtual object. In this case, it may be determined that the detection result of the second line-of-sight point is the first result, and the first result characterizes that the second line-of-sight point is visible to the first virtual object.

Operation 2035: determine that the detection result of the at least one second line-of-sight point is a second result if at least one of the first detection condition and the second detection condition is not satisfied, the second result characterizing that the at least one second line-of-sight point is invisible to the first virtual object.

If the first detection condition is not satisfied, the second line-of-sight point is located outside the field of view range corresponding to the updated first field of view information of the first virtual object, and the first virtual object cannot see the portion of the second line-of-sight point on the second virtual object. If the second detection condition is not satisfied, the light ray cannot reach the second line-of-sight point from the first line-of-sight point. That is, the first virtual object cannot see the portion of the second line-of-sight point on the second virtual object. If neither the first detection condition nor the second detection condition is satisfied, the second line-of-sight point is located outside the field of view range corresponding to the updated first field of view information of the first virtual object, the light ray cannot reach the second line-of-sight point from the first line-of-sight point, and the first virtual object cannot see the portion of the second line-of-sight point on the second virtual object. In a case that the first virtual object cannot see a portion of any second line-of-sight point on the second virtual object, it may be determined that the detection result of the second line-of-sight point is the second result. The second result characterizes that the second line-of-sight point is visible to the first virtual object.

The data processing method provided by the aspects described herein may be encapsulated into a component, and the component corresponds to an interface. An external system may invoke the component through the interface and determine whether a virtual object in a game is a visible virtual object of another virtual object through the component.

The information (including, but not limited to, user device information, user personal information, and the like), data (including, but not limited to, data for analysis, stored data, displayed data, and the like), and signals involved in this application all are authorized by the user or fully authorized by each party, and the collection, use, and processing of relevant data to comply with relevant laws and regulations of relevant regions. For example, the field of view information referred to in this application is all acquired under full authorization.

In the above-mentioned method, the first virtual object corresponds to the first line-of-sight point, and the second virtual object corresponds to the plurality of second line-of-sight points. Any second line-of-sight point is detected based on the first line-of-sight point and the updated first field of view information of the first virtual object to obtain whether the second line-of-sight point is visible at the first line-of-sight point. As long as there is a second line-of-sight point visible from the first line-of-sight point in the plurality of second line-of-sight points, it is determined that the second virtual object is the visible virtual object of the first virtual object. Multi-directional detection is realized by detecting whether the plurality of second line-of-sight points are visible, thereby improving the detection authenticity. In a case that a special terrain easily blocks a virtual object, the first virtual object can easily find a visible virtual object through the multi-directional detection, thereby improving the authenticity. In addition, in the aspects described herein, whether the virtual objects are visible is determined by detecting whether the line-of-sight points are visible, helping to improve data processing efficiency related to associations (for example, visibility) among different virtual objects in a virtual 3D scene.

In some aspects, if there is a detection result of the second line-of-sight point characterizing that the second line-of-sight point is visible to the first virtual object, the second line-of-sight point may be recorded as the target line-of-sight point. If detection results of all second line-of-sight points characterize that the second line-of-sight point is invisible to the first virtual object, there is no target line-of-sight point on the second virtual object.

If there is a target line-of-sight point on the second virtual object, the target line-of-sight point is visible to the first virtual object. In other words, the second virtual object is visible to the first virtual object, and the second virtual object may be determined as the visible virtual object of the first virtual object.

Figure 6:
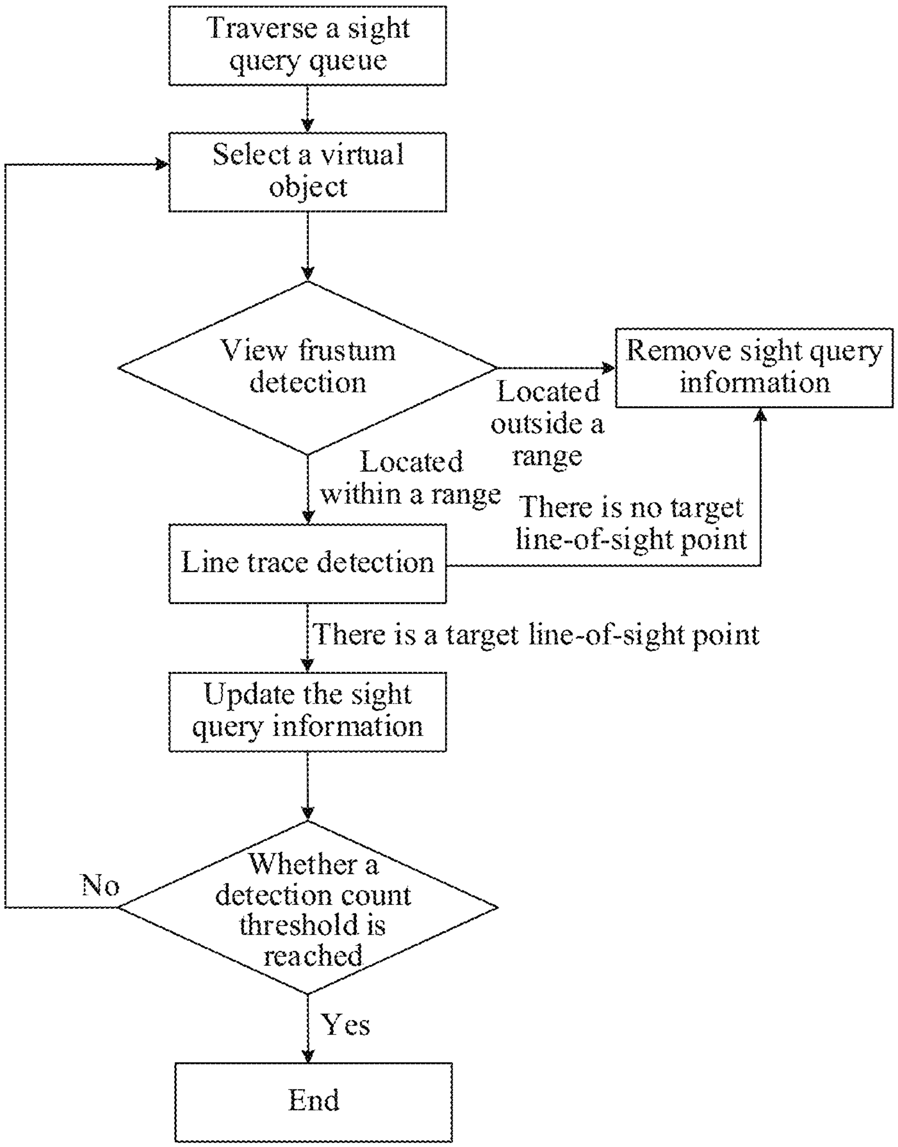
FIG. 6 is a schematic diagram of detecting a virtual object according to one or more illustrative aspects described herein.

The data processing method provided by the aspects described herein has been explained above from the aspect of method operations, and the description will be described systematically below. Referring to FIG. 6, FIG. 6 is a schematic diagram of detecting a virtual object according to an aspect described herein.

In the aspects described herein, one game battle corresponds to one sight query queue. After a game battle is started, each time a virtual object is initialized, the virtual object is registered as a member in the sight query queue. For an NPC (corresponding to the first virtual object) with a visual capability, in any frame of game picture of a game battle, the sight query queue may be traversed. A virtual object is selected from the sight query queue, and a view frustum detection is performed on the virtual object based on a view frustum of the NPC. A view frustum of the NPC refers to a field of view range of the NPC, and performing view frustum detection on the virtual object is to determine whether the virtual object is located within the field of view range of the NPC.

If the virtual object is located outside a view frustum range of the NPC, the virtual object is not located within the field of view range of the NPC. In this case, sight query information of the virtual object may be removed. The sight query information herein refers to information that may reflect the virtual object. For example, the sight query information includes at least one of an identifier of the virtual object, a position of the virtual object, a player manipulating the virtual object, and the like.

If the virtual object is located within the view frustum range of the NPC, the virtual object is located within the field of view range of the NPC. In this case, the line trace detection may be performed on the virtual object (corresponding to the second virtual object). The NPC includes the first line-of-sight point, and the virtual object includes a plurality of second line-of-sight points. If a connecting line between the first line-of-sight point and any second line-of-sight point is located within a view frustum range of the NPC and the connecting line does not pass through a non-transparent object, the second line-of-sight point is determined as the target line-of-sight point.

If there is no target line-of-sight point on the virtual object, the virtual object is completely blocked by the non-transparent object, or some parts of the virtual object are blocked by the non-transparent object and the remaining parts are located outside a field of view range of the NPC so that the NPC cannot see the virtual object. In this case, the sight query information of the virtual object may be removed.

If there is a target line-of-sight point on the virtual object, all or some parts of the virtual object are not blocked by the non-transparent object, and these parts is located within the field of view range of the NPC so that the NPC may see the virtual object. In this case, the sight query information of the virtual object may be updated. For example, at least one of the identifier of the virtual object, the position of the virtual object, the player manipulating the virtual object, and the like is added.

Next, whether the count of line trace detections reaches the detection count threshold is determined. If the count of line trace detections reaches the detection count threshold, i.e., the count of line trace detections is greater than or equal to the detection count threshold, the procedure is ended. If the count of line trace detections does not reach the detection count threshold, i.e., the count of line trace detections is less than the detection count threshold, the operation of selecting a virtual object from the sight query queue is performed, and the detection is performed in the above-mentioned manner until the count of line trace detections reaches the detection count threshold, and the procedure is ended.

Figure 7:
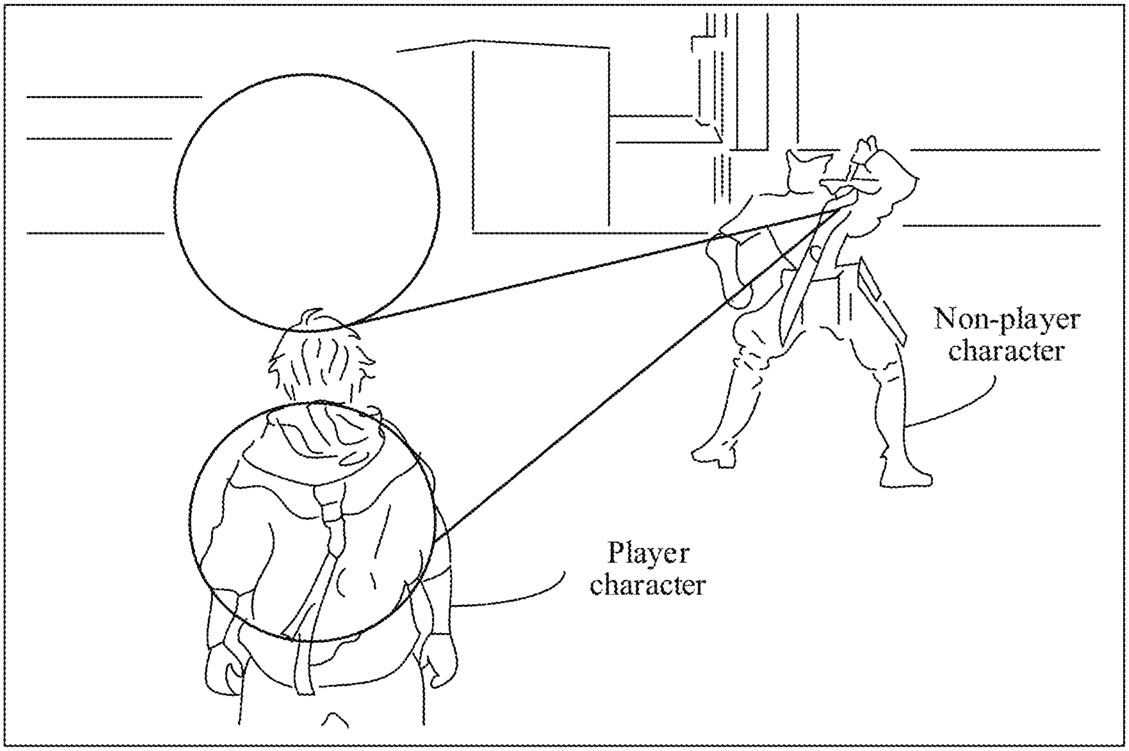
FIG. 7 is a schematic diagram of a line trace detection according to one or more illustrative aspects described herein.

In the aspects described herein, the NPC with a visual capability includes the first line-of-sight point, and the virtual object includes a plurality of second line-of-sight points. The line trace detection may be performed based on the first line-of-sight point and any second line-of-sight point. As shown in FIG. 7, an NPC (i.e., an NPC with a visual capability) has a first line-of-sight point, and the head and the body of a PC (i.e., a virtual object) each have a second line-of-sight point. The line trace detection may be performed based on the first line-of-sight point and the second line-of-sight point located on the head of the PC, and the line trace detection may be performed based on the first line-of-sight point and the second line-of-sight point located on the body of the PC.

Figure 8:
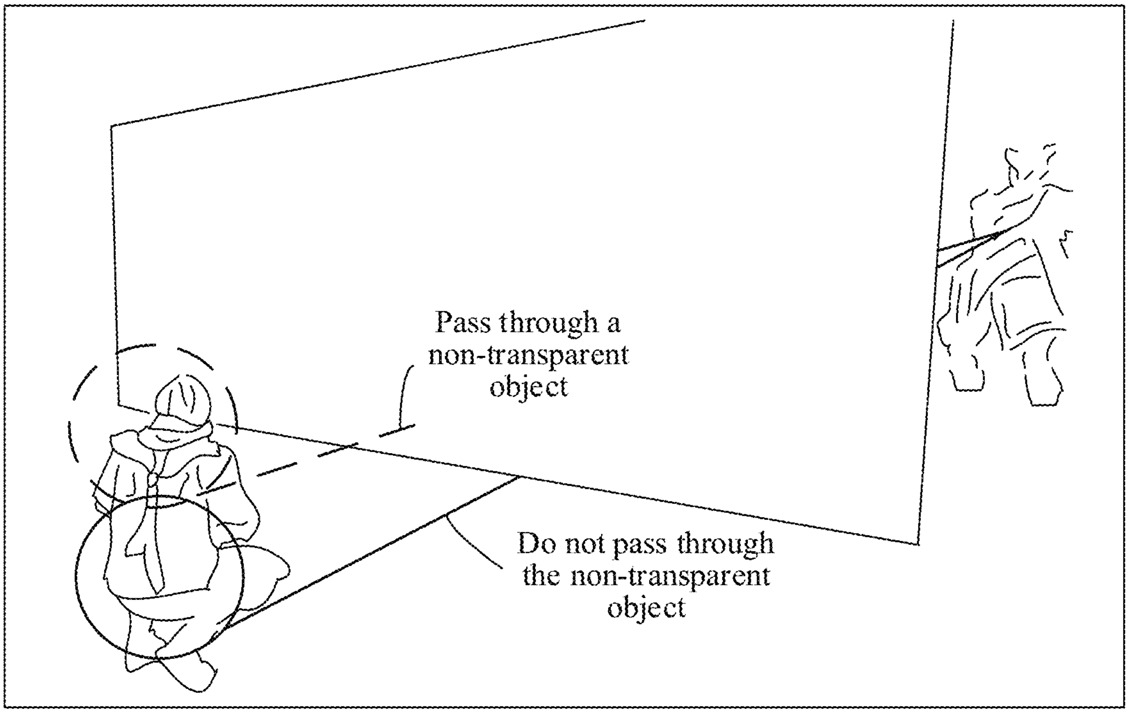
FIG. 8 is a schematic diagram of another line trace detection according to one or more illustrative aspects described herein.
Figure 9:
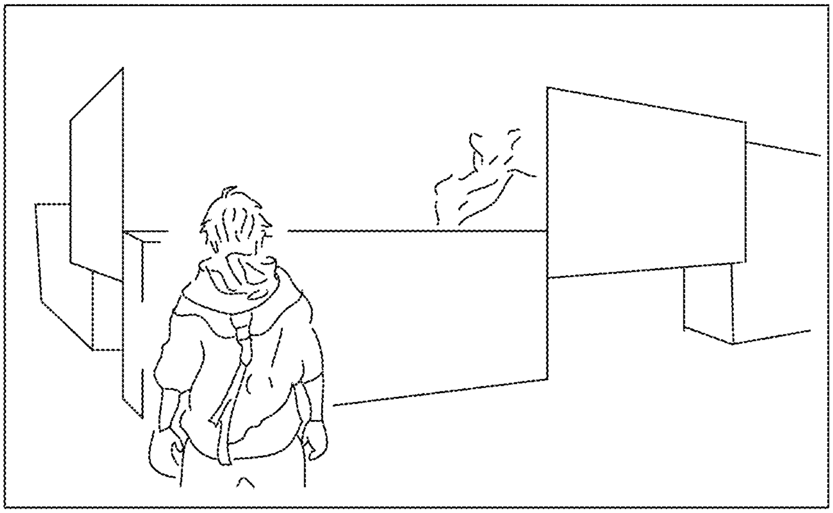
FIG. 9 is a schematic diagram of an NPC discovering a player character (PC) according to one or more illustrative aspects described herein.

When the line trace detection is performed based on the first line-of-sight point and any second line-of-sight point, as long as a connecting line between the first line-of-sight point and the second line-of-sight point is located within the view frustum range of the NPC and the connecting line does not pass through a non-transparent object, the second line-of-sight point is determined as the target line-of-sight point. In this case, the NPC may see a portion of the target line-of-sight point on the virtual object so that the virtual object is found by the NPC. As shown in FIG. 8, when a line trace detection is performed based on the first line-of-sight point of the NPC and the second line-of-sight point located at the head of the PC, since a connecting line between the first line-of-sight point and the second line-of-sight point passes through a non-transparent object, the NPC cannot see the head of the PC. However, when a line trace detection is performed based on the first line-of-sight point of the NPC and the second line-of-sight point located at the lower extremity of the PC, since a connecting line between the first line-of-sight point and the second line-of-sight point does not pass through the non-transparent object and is located within the view frustum range of the NPC, the NPC can see the lower extremity of the PC. Although the NPC cannot see the head of the PC, since the NPC can see the lower extremity of the PC, the NPC still can find the PC. Still as shown in FIG. 9, although the NPC cannot see the body of the PC, since the NPC can see the head of the PC, the NPC still can find the PC.

Figure 10:
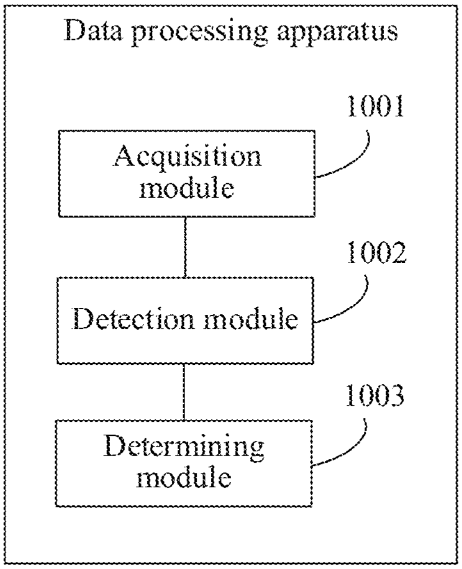
FIG. 10 is a schematic structural diagram of a data processing apparatus according to one or more illustrative aspects described herein.

FIG. 10 is a schematic structural diagram of a data processing apparatus according to an aspect described herein. As shown in FIG. 10, the apparatus includes:

an acquisition module 1001 configured to acquire first field of view information and a first line-of-sight point of a first virtual object, the first line-of-sight point being a point located at a specified portion of the first virtual object; and acquire a plurality of second line-of-sight points of a second virtual object, the first virtual object and the second virtual object being located in the same 3D scene, and each second line-of-sight point being a point located at a corresponding portion of the second virtual object; a detection module 1002 configured to detect at least one second line-of-sight point based on the first line-of-sight point and the first field of view information to obtain a detection result of the at least one second line-of-sight point, a detection result of each second line-of-sight point characterizing whether each second line-of-sight point is visible from the first line-of-sight point; and a determining module 1003 configured to determine the second virtual object as a visible virtual object of the first virtual object if the detection result of the at least one second line-of-sight point characterizes that the at least one second line-of-sight point is visible from the first line-of-sight point.

When the apparatus provided in FIG. 10 implements the functions of the apparatus, division of the foregoing function modules is used as an example for description. In the practical application, the above-mentioned functions may be allocated to and completed by different function modules according to requirements. That is, an internal structure of the device is divided into different function modules to complete all or some of the functions described above. In addition, the apparatus provided in the foregoing aspect belongs to the same idea as the method aspect. Details of a specific implementation process may refer to the method aspect, and details are not described herein again.

Figure 11:
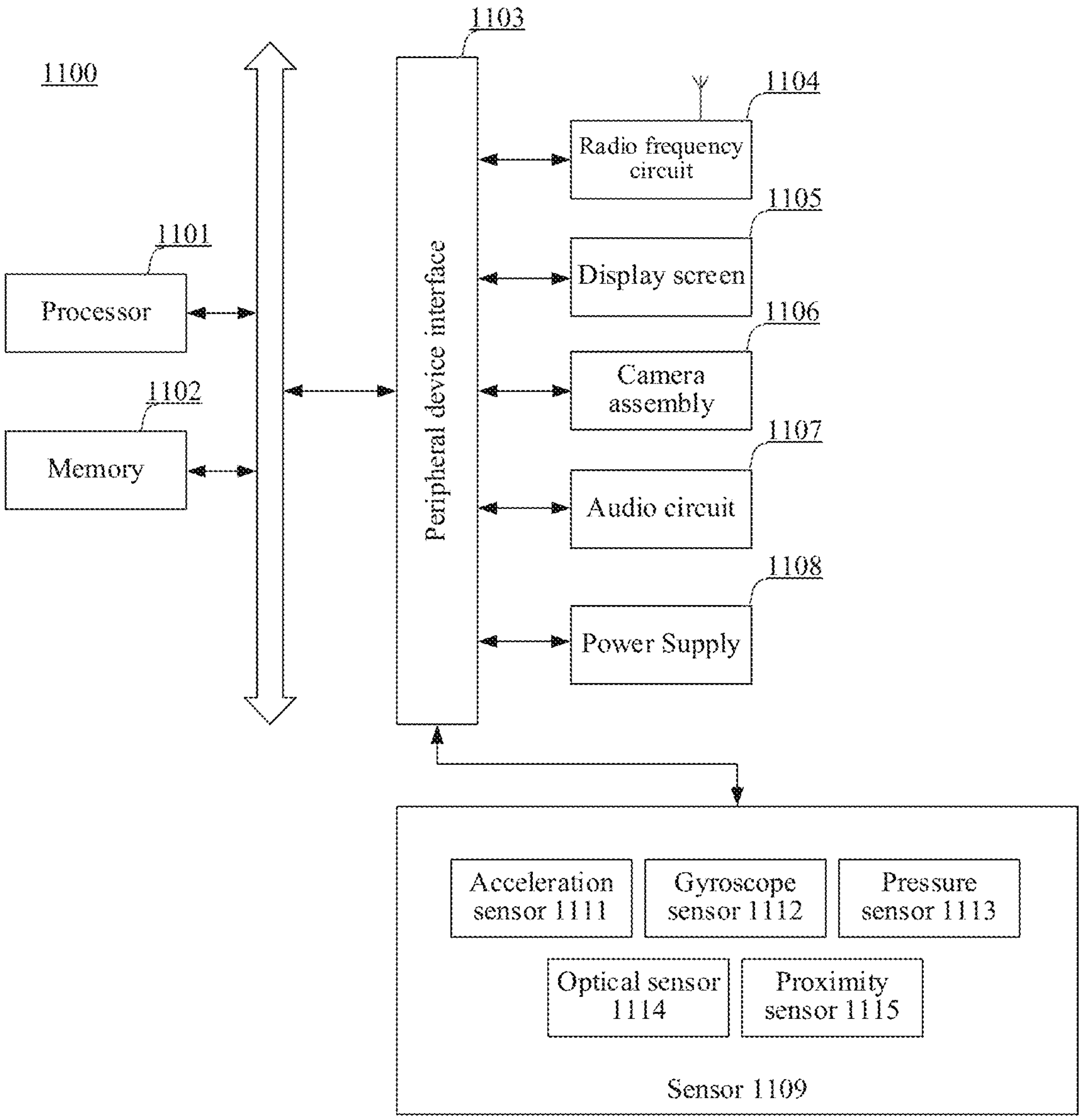
FIG. 11 is a schematic structural diagram of a terminal device according to one or more illustrative aspects described herein.

FIG. 11 is a structural block diagram of a terminal device 1100 according to an exemplary aspect described herein. The terminal device 1100 includes: a processor 1101 and a memory 1102.

The processor 1101 may include one or more processing cores, for example, a 4-core processor or an 8-core processor. The processor 1101 may be implemented in at least one hardware form of digital signal processing (DSP), a field-programmable gate array (FPGA), and a programmable logic array (PLA). The processor 1101 may further include a main processor and a coprocessor. The main processor is a processor configured to process data in an awake status and is also referred to as a central processing unit (CPU). The coprocessor is a low-power-consumption processor configured to process data in a standby status. In some aspects, the processor 1101 may be integrated with a graphics processing unit (GPU). The GPU is configured to render and draw content to be displayed on a display screen. In some aspects, the processor 1101 may further include an AI processor. The AI processor is configured to process computing operations related to machine learning.

The memory 1102 may include one or more computer-readable storage media. The computer-readable storage medium may be non-transient. The memory 1102 may further include a high-speed random access memory and a nonvolatile memory, for example, one or more disk storage devices or flash storage devices. In some aspects, the non-transient computer-readable storage medium in the memory 1102 is configured to store at least one computer program. The at least one computer program is configured to be executed by the processor 1101 to implement the data processing method provided in the method aspects described herein.

In some aspects, the terminal device 1100 may further include: a peripheral device interface 1103 and at least one peripheral device. The processor 1101, the memory 1102, and the peripheral device interface 1103 may be connected through a bus or a signal line. Each peripheral device may be connected to the peripheral device interface 1103 through a bus, a signal line, or a circuit board. Specifically, the peripheral device includes: at least one of a radio frequency (RF) circuit 1104, a display screen 1105, a camera component 1106, an audio circuit 1107, or a power supply 1108.

The peripheral device interface 1103 may be configured to connect at least one peripheral device related to input/output (I/O) to the processor 1101 and the memory 1102. In some aspects, the processor 1101, the memory 1102, and the peripheral device interface 1103 are integrated on the same chip or circuit board. In some other aspects, any one or two of the processor 1101, the memory 1102, and the peripheral device interface 1103 may be implemented on a single chip or circuit board. This is not limited in this aspect.

The RF circuit 1104 is configured to receive and transmit an RF signal, also referred to as an electromagnetic signal. The RF circuit 1104 communicates with a communication network and other communication devices through the electromagnetic signal. The RF circuit 1104 converts an electrical signal into an electromagnetic signal for transmission, or converts a received electromagnetic signal into an electrical signal. In one aspect, the RF circuit 1104 includes: an antenna system, an RF transceiver, one or more amplifiers, a tuner, an oscillator, a digital signal processor, a codec chipset, a user identity module card, and the like. The RF circuit 1104 may communicate with another terminal through at least one wireless communication protocol. The wireless communication protocol includes but is not limited to a world wide web, a metropolitan area network, an intranet, various generations of mobile communication networks (2G, 3G, 4G, and 5G), a wireless local area network, and/or a wireless fidelity (WiFi) network. In some aspects, the RF 1104 may further include a circuit related to near field communication (NFC). This is not limited in this application.

The display screen 1105 is configured to display a user interface (UI). The UI may include a graph, a text, an icon, a video, and any combination thereof. When the display screen 1105 is a touch display screen, the display screen 1105 further has a capability of acquiring a touch signal on or above a surface of the display screen 1105. The touch signal may be inputted to the processor 1101 as a control signal for processing. In this case, the display screen 1105 may be further configured to provide a virtual button and/or a virtual keyboard, referred to as a soft button and/or a soft keyboard. In some aspects, one display screen 1105 may be provided on a front panel of the terminal device 1100. In some other aspects, there may be at least two display screens 1105 provided on different surfaces of the terminal device 1100 or in a folded design. In some other aspects, the display screen 1105 may be a flexible display screen provided on a curved surface or a folded surface of the terminal device 1100. Even, the display screen 1105 may be further provided in a non-rectangular irregular pattern, i.e., a special-shaped screen. The display screen 1105 may be prepared using materials such as a liquid crystal display (LCD) and an organic light-emitting diode (OLED).

The camera component 1106 is configured to acquire images or videos. In one aspect, the camera component 1106 includes a front camera and a rear camera. Generally, the front camera is provided on the front panel of the terminal, and the rear camera is provided on a back surface of the terminal. In some aspects, there are at least two rear cameras, which are any of main cameras, depth-of-field cameras, wide-angle cameras, and telephoto cameras, to achieve a background blur function through fusion of the main camera and the depth-of-field camera, panoramic photographing and virtual reality (VR) photographing functions through fusion of the main camera and the wide-angle camera, or other fusion photographing functions. In some aspects, the camera component 1106 may further include a flash. The flash may be a monochrome temperature flash, or may be a double color temperature flash. The double color temperature flash refers to a combination of a warm light flash and a cold light flash, and may be configured for light compensation under different color temperatures.

The audio circuit 1107 may include a microphone and a speaker. The microphone is configured to acquire sound waves of a user and an environment, and convert the sound waves into electrical signals to input to the processor 1101 for processing, or input to the RF circuit 1104 for implementing voice communication. For the purpose of stereo acquisition or noise reduction, there may be a plurality of microphones, provided at different portions of the terminal device 1100. The microphone may further be an array microphone or an omni-directional acquisition type microphone. The speaker is configured to convert the electrical signals from the processor 1101 or the RF circuit 1104 into sound waves. The speaker may be a conventional film speaker, or may be a piezoelectric ceramic speaker. When the speaker is the piezoelectric ceramic speaker, the speaker may convert the electrical signal into a sound wave audible to the human being, and convert the electrical signal into a sound wave inaudible to the human being, for ranging and other purposes. In some aspects, the audio circuit 1107 may further include an earphone jack.

The power supply 1108 is configured to supply power to components in the terminal device 1100. The power supply 1108 may be an alternating current, a direct current, a disposable battery, or a rechargeable battery. When the power supply 1108 includes a rechargeable battery, the rechargeable battery may be a wired rechargeable battery or a wireless rechargeable battery. The wired rechargeable battery is a battery charged through a wired line, and the wireless rechargeable battery is a battery charged through a wireless coil. The rechargeable battery may be further configured to support a fast charging technology.

In some aspects, the terminal device 1100 further includes one or more sensors 1109. The one or more sensors 1109 include, but are not limited to, an acceleration sensor 1111, a gyroscope sensor 1112, a pressure sensor 1113, an optical sensor 1114, and a proximity sensor 1115.

The acceleration sensor 1111 may detect magnitudes of accelerations on three coordinate axes of a coordinate system established with the terminal device 1100. For example, the acceleration sensor 1111 may be configured to detect components of gravity acceleration on the three coordinate axes. The processor 1101 may control the display screen 1105 to display the UI in a landscape view or a portrait view according to a gravity acceleration signal acquired by the acceleration sensor 1111. The acceleration sensor 1111 may be further configured to acquire motion data of a game or a user.

The gyroscope sensor 1112 may detect a body direction and a rotation angle of the terminal device 1100. The gyroscope sensor 1112 may cooperate with the acceleration sensor 1111 to acquire a 3D action by the user on the terminal device 1100. The processor 1101 may realize the following functions according to the data acquired by the gyroscope sensor 1112: action sensing (such as changing the UI according to a tilt operation of the user), image stabilization during photographing, game control, and inertial navigation.

The pressure sensor 1113 may be provided at a side frame of the terminal device 1100 and/or a lower layer of the display screen 1105. When the pressure sensor 1113 is provided at the side frame of the terminal device 1100, a holding signal of the user on the terminal device 1100 may be detected. The processor 1101 performs left and right hand recognition or a quick operation according to the holding signal acquired by the pressure sensor 1113. When the pressure sensor 1113 is provided on the low layer of the display screen 1105, the processor 1101 controls an operable control on the UI according to a pressure operation of the user on the display screen 1105. The operable control includes at least one of a button control, a scroll-bar control, an icon control, and a menu control.

The optical sensor 1114 is configured to acquire ambient light intensity. In one aspect, the processor 1101 may control the display brightness of the display screen 1105 according to the ambient light intensity acquired by the optical sensor 1114. Specifically, when the ambient light intensity is high, the display brightness of the display screen 1105 is increased. When the ambient light intensity is low, the display brightness of the display screen 1105 is decreased. In another aspect, the processor 1101 may further dynamically adjust photographing parameters of the camera component 1106 according to the ambient light intensity acquired by the optical sensor 1114.

The proximity sensor 1115, also referred to as a distance sensor, is generally provided on the front panel of the terminal device 1100. The proximity sensor 1115 is configured to acquire a distance between the user and a front surface of the terminal device 1100. In one aspect, when the proximity sensor 1115 detects that the distance between the user and the front surface of the terminal device 1100 gradually decreases, the display screen 1105 is controlled by the processor 1101 to switch from a screen-on status to a screen-off status. When the proximity sensor 1115 detects that the distance between the user and the front surface of the terminal device 1100 gradually increases, the display screen 1105 is controlled by the processor 1101 to switch from the screen-off status to the screen-on status.

A person skilled in the art may understand that the structure shown in FIG. 11 constitutes no limitation on the terminal device 1100, and the terminal device may include more or fewer components than those shown in the figure, or a combination of some components, or have a different arrangement of components.

Figure 12:
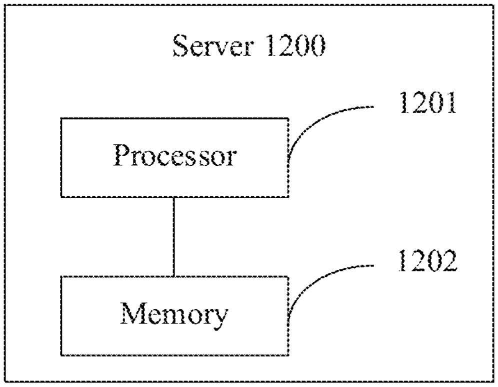
FIG. 12 is a schematic structural diagram of a server according to one or more illustrative aspects described herein.

FIG. 12 is a schematic structural diagram of a server according to an aspect described herein. The server 1200 may vary greatly due to different configurations or performances and may include one or more processors 1201 and one or more memories 1202. The one or more memories 1202 have at least one computer program stored therein. The at least one computer program is loaded and executed by the one or more processors 1201 to implement the data processing method provided in the foregoing method aspects. Illustratively, the processor 1201 is a CPU. The server 1200 may further have assemblies such as a wired or wireless network interface, a keyboard, and an I/O interface for inputting and outputting. The server 1200 may further include other assemblies configured to implement device functions, and details are not described herein.

In an exemplary aspect, a computer-readable storage medium is further provided, having at least one computer program stored therein. The at least one computer program is loaded and executed by a processor to cause an electronic device to implement the data processing method according to any one of the foregoing aspects.

In one aspect, the above-mentioned computer-readable storage medium may be a read-only memory (ROM), a random access memory (RAM), a compact disc read-only memory (CD-ROM), a magnetic tape, a floppy disk, an optical data storage device, or the like.

In an exemplary aspect, a computer program or computer program product is further provided, having at least one computer program stored therein. The at least one computer program is loaded and executed by a processor to cause an electronic device to implement the data processing method according to any one of the foregoing aspects.

"A plurality of" mentioned herein refers to two or more. "And/or" describes an association relationship of associated objects and represents that three relationships may exist. For example, A and/or B may represent the following three cases: only A exists, both A and B exist, and only B exists. The character "/" generally indicates an "or" relationship between the associated objects.

The sequence numbers of the above-mentioned aspects described herein are merely for the purpose of description and do not represent the advantages and disadvantages of the aspects.

The foregoing descriptions are merely exemplary aspects described herein, but are not intended to limit this application. Any modification, equivalent replacement, or improvement made within the principle of this application shall fall within the protection scope of this application.

In the aspects described herein, the term "module" or "unit" refers to a computer program having a predetermined function or a part of a computer program, works together with other relevant parts to achieve a predetermined objective, and may be all or partially implemented through software, hardware (such as a processing circuit or a memory), or a combination thereof. Similarly, one processor (or a plurality of processors or memories) may be configured to implement one or more modules or units. In addition, each module or unit may be a part of an overall module or unit including a function of the module or unit.

What is claimed is:

1. A data processing method, performed in an electronic device, comprising:

acquiring first field of view information of a first virtual object and a first line-of-sight point of the first virtual object, wherein the first line-of-sight point comprises a point located at a specified portion of the first virtual object;

acquiring a plurality of second line-of-sight points of a second virtual object, wherein the first virtual object and the second virtual object are located in the same three-dimensional scene, and wherein each second line-of-sight point comprises a point located at a corresponding portion of the second virtual object;

detecting at least one second line-of-sight point, of the plurality of second line-of-sight, based on the first line-of-sight point and the first field of view information;

obtaining at least one detection result, wherein each of the at least one detection result characterizes whether a corresponding second line-of-sight point, of the at least one second line-of-sight point, is visible from the first line-of-sight point; and determining, based on the at least one detection result characterizing that the at least one second line-of-sight point is visible from the first line-of-sight point, the second virtual object as a visible virtual object of the first virtual object.

2. The method according to claim 1, further comprising:

determining whether each of the plurality of second line-of-sight point satisfies a target detection condition; and wherein the detecting the at least one second line-of-sight point is based on a determination that each of the at least one second light-of-sight point satisfying the target detection condition, and wherein the detecting uses the first line-of-sight point and the first field of view information.

3. The method according to claim 2, further comprising:

acquiring detection priorities of the second virtual objects and detection priorities of the second line-of-sight points;

acquiring a current detection count for any second line-of-sight point, wherein the current detection count is a sum of a count of first detections and a count of second detections; the first detection is a detection performed on a second line-of-sight point of a second virtual object whose detection priority is located before a detection priority of a second virtual object of the any second line-of-sight point, and the second detection is a detection performed on a second line-of-sight point whose detection priority is located before a detection priority of the any second line-of-sight point on the second virtual object of the any second line-of-sight point; and determining that the any second line-of-sight point needs to be detected based on the current detection count is less than a detection count threshold.

4. The method according to claim 3, wherein the first field of view information comprises a plurality of pieces of sub-field of view information, and the acquiring detection priorities of the second virtual objects comprises:

determining, for any second virtual object, sub-field of view information of the any second virtual object based on a position of the any second virtual object; and determining a detection priority of the any second virtual object based on a distance between the first virtual object and the any second virtual object and the sub-field of view information of the any second virtual object.

5. The method according to claim 1, wherein the acquiring first field of view information of a first virtual object comprises:

acquiring initial first field of view information of the first virtual object; and updating the first field of view information based on the first virtual object satisfying a field of view update condition, wherein the field of view update condition comprises at least one of:

a height between an edge of a horizontal field of view of the first virtual object and a virtual ground satisfies a height condition;

virtual weather in a virtual environment in which the first virtual object is located changes; and a fight state of the first virtual object changes, wherein the fight state characterizes whether the first virtual object fights with another virtual object.

6. The method according to claim 5, wherein the field of view update condition comprises the height satisfying the height condition, and wherein the method further comprises, determining, before the updating the first field of view information to obtain updated first field of view information, the height based on the first line-of-sight point and the first field of view information based on the first virtual object is initialized or the first virtual object moves.

7. The method according to claim 6, wherein:

the height satisfying the height condition comprises that the height is greater than a first height threshold;

the first field of view information comprises a first field of view distance; and the updating the first field of view information to obtain updated first field of view information comprises:

expanding the first field of view distance based on the height to obtain a second field of view distance;

determining the updated first field of view information using a first field of view distance based on the second field of view distance is greater than the first field of view threshold; and determining the updated first field of view information using the second field of view distance based on the second field of view distance is not greater than the first field of view threshold.

8. The method according to claim 5, wherein the field of view update condition comprises the virtual weather changing; and wherein the updating the first field of view information to obtain updated first field of view information comprises:

acquiring change information of the virtual weather;

zooming out a field of view range corresponding to the first field of view information to obtain the updated first field of view information characterizing a zoomed-out field of view range based on the change information of the virtual weather characterizes a decrease in visibility; and expanding the field of view range corresponding to the first field of view information to obtain the updated first field of view information characterizing an expanded field of view range based on the change information of the virtual weather characterizes an increase in visibility.

9. The method according to claim 6, wherein:

the height satisfying the height condition comprises that the height is less than a second height threshold;

the first field of view information comprises a first field of view distance; and the updating the first field of view information to obtain updated first field of view information comprises:

zooming out the first field of view distance based on the height to obtain a third field of view distance;

determining the updated first field of view information using a second field of view distance based on the third field of view distance is less than the second field of view threshold; and determining the updated first field of view information using the third field of view distance based on the third field of view distance is not less than the second field of view threshold.

10. The method according to claim 5, wherein the field of view update condition comprises the fight state changing, and wherein the updating the first field of view information to obtain updated first field of view information comprises:

zooming out a field of view range corresponding to the first field of view information to obtain the updated first field of view information characterizing a zoomed-out field of view range based on a changed fight state characterizes that the first virtual object fights with another virtual object; and expanding the field of view range corresponding to the first field of view information to obtain the updated first field of view information characterizing an expanded field of view range based on the changed fight state characterizes that the first virtual object does not fight with another virtual object.

11. The method according to claim 10, wherein:

the first field of view information comprises first-level field of view information, second-level field of view information, and third-level field of view information;

a first field of view range, corresponding to the first-level field of view information, comprises a second field of view range corresponding to the second-level field of view information;

the second field of view range comprises a third field of view range corresponding to the third-level field of view information; and the method further comprises:

determining that the fight state is a first state based on there is the visible virtual object within the third field of view range, or there is the visible virtual object within other field of view ranges except the third field of view range within the second field of view range and the visible virtual object is in a first posture, the first state characterizing that the first virtual object fights with another virtual object; and determining that the fight state is a second state based on there is the visible virtual object within other field of view ranges except the third field of view range within the second field of view range and the visible virtual object is in a second posture, or there is the visible virtual object within other field of view ranges except the second field of view range within the first field of view range, the second state characterizing that the first virtual object does not fight with another virtual object.

12. The method according to claim 5, wherein the updated first field of view information comprises a plurality of pieces of sub-field of view information, and wherein the detecting at least one second line-of-sight point comprises:

determining that the at least one detection result is a first result based on a first detection condition and a second detection condition are satisfied, wherein the first result characterizes that any second line-of-sight point is visible from the first line-of-sight point, the first detection condition is that a connecting line between the first line-of-sight point and the at least one second line-of-sight point is located within a field of view range corresponding to at least one piece of sub-field of view information, and the second detection condition is that the connecting line does not pass through a non-transparent object; or determining that the at least one detection result is a second result based on at least one of the first detection condition and the second detection condition is not satisfied, the second result characterizing that the at least one second line-of-sight point is invisible to the first virtual object.

13. A data processing apparatus, comprising:

one or more processors;

memory storing instructions, when executed by the one or more processors, configure the data processing apparatus to perform actions comprising:

acquiring first field of view information of a first virtual object and a first line-of-sight point of the first virtual object, wherein the first line-of-sight point comprises a point located at a specified portion of the first virtual object;

acquiring a plurality of second line-of-sight points of a second virtual object, wherein the first virtual object and the second virtual object are located in the same three-dimensional scene, and each second line-of-sight point is a point located at a corresponding portion of the second virtual object;

detecting at least one second line-of-sight point, of the plurality of second line-of-sight, based on the first line-of-sight point and the first field of view information;

obtaining at least one detection result, wherein each of the at least one detection result characterizes whether a corresponding second line-of-sight point, of the at least one second line-of-sight point, is visible from the first line-of-sight point; and determining, based on the at least one detection result characterizing that the at least one second line-of-sight point is visible from the first line-of-sight point, the second virtual object as a visible virtual object of the first virtual object.

14. The data processing apparatus according to claim 13, wherein the instructions, when executed by the one or more processors, further configure the data processing apparatus to determine whether each of the plurality of second line-of-sight point satisfies a target detection condition; and wherein the instructions, when executed by the one or more processors, configure the data processing apparatus to detect the at least one second line-of-sight point based on a determination that each of the at least one second light-of-sight point satisfying the target detection condition and using the first line-of-sight point and the first field of view information.

15. The data processing apparatus according to claim 13, wherein the instructions, when executed by the one or more processors, further configure the data processing apparatus to acquire first field of view information of a first virtual object by performing actions comprising:

acquiring initial first field of view information of the first virtual object; and updating the first field of view information based on the first virtual object satisfying a field of view update condition, wherein the field of view update condition comprises at least one of:

a height between an edge of a horizontal field of view of the first virtual object and a virtual ground satisfies a height condition;

virtual weather in a virtual environment in which the first virtual object is located changes; and a fight state of the first virtual object changes, wherein the fight state characterizes whether the first virtual object fights with another virtual object.

16. The data processing apparatus according to claim 15, wherein the field of view update condition comprises the height satisfying the height condition, and wherein the instructions, when executed by the one or more processors, configure the data processing apparatus to determine, before updating the first field of view information to obtain updated first field of view information, the height based on the first line-of-sight point and the first field of view information based on the first virtual object is initialized or the first virtual object moves.

17. A non-transitory computer-readable storage medium storing instructions that, when executed by a processor, cause performance of actions comprising:

acquiring first field of view information of a first virtual object and a first line-of-sight point of the first virtual object, wherein the first line-of-sight point comprises a point located at a specified portion of the first virtual object;

acquiring a plurality of second line-of-sight points of a second virtual object, wherein the first virtual object and the second virtual object are located in the same three-dimensional scene, and each second line-of-sight point is a point located at a corresponding portion of the second virtual object;

detecting at least one second line-of-sight point, of the plurality of second line-of-sight, based on the first line-of-sight point and the first field of view information;

obtaining at least one detection result, wherein each of the at least one detection result characterizes whether a corresponding second line-of-sight point, of the at least one second line-of-sight point, is visible from the first line-of-sight point; and determining, based on the at least one detection result characterizing that the at least one second line-of-sight point is visible from the first line-of-sight point, the second virtual object as a visible virtual object of the first virtual object.

18. The non-transitory computer-readable medium according to claim 17, wherein the instructions, when executed, further cause determining whether each of the plurality of second line-of-sight point satisfies a target detection condition; and wherein the instructions, when executed, cause detecting the at least one second line-of-sight point based on a determination that each of the at least one second light-of-sight point satisfying the target detection condition and using the first line-of-sight point and the first field of view information.

19. The non-transitory computer-readable medium according to claim 17, wherein the instructions, when executed, further cause acquiring the first field of view information of the first virtual object by performing actions comprising:

acquiring initial first field of view information of the first virtual object; and updating the first field of view information based on the first virtual object satisfying a field of view update condition, wherein the field of view update condition comprises at least one of:

a height between an edge of a horizontal field of view of the first virtual object and a virtual ground satisfies a height condition;

virtual weather in a virtual environment in which the first virtual object is located changes; and a fight state of the first virtual object changes, wherein the fight state characterizes whether the first virtual object fights with another virtual object.

20. The non-transitory computer-readable medium according to claim 17, wherein the field of view update condition comprises the height satisfying the height condition, and wherein the instructions, when executed, cause determining, before updating the first field of view information to obtain updated first field of view information, the height based on the first line-of-sight point and the first field of view information based on the first virtual object is initialized or the first virtual object moves.

* * * * *